INVENTORS
IRL N. DULING
DAVID S. GATES

BY *Barry A. Bisson*
ATTORNEY

United States Patent Office 3,843,537
Patented Oct. 22, 1974

3,843,537
BLENDED TRACTION FLUID CONTAINING CYCLIC COMPOUNDS
Irl N. Duling, West Chester, and David S. Gates, Swarthmore, Pa., assignors to Sun Oil Company of Pennsylvania, Philadelphia, Pa.
Continuation-in-part of application Ser. No. 679,833, Nov. 1, 1967. This application June 23, 1971, Ser. No. 155,986
Int. Cl. C10m 1/18, 3/10
U.S. Cl. 252—59                                    12 Claims

ABSTRACT OF THE DISCLOSURE

A method for improving the coefficient of traction between relatively rotatable members in torque transmitting relationship comprises introducing to the tractive surfaces of said members a lubricant containing from 95–50 weight percent of a hydrocarbon base stock containing a blend of a saturated or partially saturated cyclic hydrocarbon containing from about 12 to 70 carbon atoms (preferably 13 to 40) and at least one member selected from (a) a synthetic liquid homopolymer, copolymer or terpolymer of a $C_3$–$C_8$ olefin;

(b) a member of group (a) above which is at least partially hydrogenated, or (c) a hydrorefined naphthenic lube or paraffinic lube.

In a preferred embodiment, the saturated or partially saturated hydrocarbon has at least one fused carbocyclic ring or contains at least two carbocyclic rings which are not fused. Preferably the tractant has a kinematic viscosity (KV) at 210° F. in the range of 2–12 and has a coefficient of traction at least about as high as that of ASTM Oil No. 3 at 400,000 p.s.i., 200° F. and 600 ft./min. (the coefficient being measured at 600 ft./min. or at a higher and a lower velocity and extrapolated to 600 ft./min.). A preferred blend comprises a blend of $C_{13}$–$C_{40}$ naphthene having a glass transition temperature in the range of −90 to −30° C. and a substantially fully hydrogenated polyolefin oil.

CROSS REFERENCES TO RELATED APPLICATIONS

This application is a continuation-in-part of our copending application Ser. No. 679,833 (filed Nov. 1, 1967), now U.S. 3,595,796 (issued July 27, 1971).

The present application is copending with the following related applications, all of which are assigned to the Sun Oil Company (as is the present application).

| Serial No. | Filing date | Title/Inventor(s) |
|---|---|---|
| 440,614 (now U.S. 3,641,167, issued 2-8-72) | 3-17-65 | Highly Fluorinated Alkyladamantanes, Robert E. Moore and Edward J. Janoski |
| 621,443 (now abandoned) | 3-8-67 | Synthetic Lubricants From Low Molecular Weight Olefins, Richard S. Stearns, Irl N. Duling and David S. Gates. |
| 679,801 (now U.S. 3,597,358, issued 8-3-71) | 11-1-67 | Traction Drive Transmission Containing Adamantane Compounds as Lubricant, Irl N. Duling, Frederick P. Glazier, David S. Gates and Robert E. Moore. |
| 679,833 (now U.S. 3,595,796, issued 7-27-71) | 11-1-67 | Traction Drive Transmission Containing Naphthenes, Branched Paraffins, or Blends of Naphthenes and Branched Paraffins as Lubricant, Irl N. Duling and David S. Gates. |
| 679,834 (now U.S. 3,595,797, issued 7-27-71) | 11-1-67 | Blending Branched Paraffin Fluids for Use in Traction Drive Transmission, Irl N. Duling, David S. Gates and Marcus W. Haseltine, Jr. |
| 679,851 (now U.S. 3,598,740, issued 8-10-71) | 11-1-67 | Traction Drive Transmission Containing Paraffinic Oil as Lubricant, Irl N. Duling, David S. Gates and Thomas D. Newingham. |
| 784,487 (now U.S. 3,646,224, issued 2-29-72) | 12-17-68 | Conversion of Adamantane Hydrocarbons to Monools, Robert E. Moore. |
| 794,844 (now U.S. 3,608,385, issued 9-28-71) | 1-24-69 | Friction Drive Fluid, Irl N. Duling and Frederick P. Glazier. |
| 812,516 (now U.S. 3,619,414, issued 11-9-71) | 2-19-69 | Catalytic Hydrofinishing of Petroleum Distillates in the LubricatingOil Boiling Range, Ivor W. Mills, Merritt C. Kirk, Jr. and Albert T. Olenzak. |
| 823,138 (now U.S. 3,560,578, issued 2-2-71) | 5-8-69 | Reaction for Linking Nuclei of Adamantane Hydrocarbons, Abraham Schneider. |
| 850,717 (now abandoned) | 8-18-69 | Hydrorefined Lube Oil and Process of Manufacture, Ivor W. Mills and Glenn R. Dimeler. |
| 876,993 (now U.S. 3,645,902, issued 2-29-72) | 11-14-69 | Friction or Tractive Drive Fluid Comprising Adamantanes, Irl N. Duling, David S. Gates, Frederick P. Glazier and Robert E. Moore. |
| 877,462 (now abandoned) | 11-17-69 | Combination of Traction Drive and Traction Fluid Comprising Saturated Cyclic Compounds, Irl N. Duling and Frederick P. Glazier. |
| 003,256 (now U.S. 3,648,531, issued 3-14-72) | 8-19-69 | Friction or Tractive Drive Fluid, Irl N. Duling, Frederick P. Glazier, David S. Gates and Robert E. Moore. |
| 028,942 | 4-15-70 | Process for Producing Polyisobutylene Oil, Alfred E. Hirschler and Gary L: Driscoll. |
| 033,023 (now abandoned) | 4-29-70 | Combination of Tractive Drive and Traction Fluid Comprising Cyclic or Acyclic Compounds, Irl N. Duling and Frederick P. Glazier. |
| 052,300 (now U.S. 3,775,503, issued 11-27-73) | 7-6-70 | Branched Hydrocarbons in the $C_{16}$–$C_{40}$ Range Having Maximally Crowded Geminal Methyl Groups, Gary L. Driscoll, Irl N. Duling, David S. Gates and Robert W. Warren. |
| 052,301 (now U.S. 3,778,487, issued 12-11-73) | 7-6-70 | Polyisobutylene Oil Having a High Viscosity Index, Gary L. Driscoll, Irl N. Duling and David S. Gates. |
| 052,771 (abandoned 8-17-71) | 7-6-70 | Polymerization of Dialkyl Vinylidene Compounds to Oils, Gary L. Driscoll. |
| 052,772 (now U.S. 3,655,808, issued 4-11-72) | 7-6-70 | Preparation of Oils from Isobutene, Gary L. Driscoll. |
| 052,773 (now U.S. 3,657,369, issued 4-18-72) | 7-6-70 | Oligimerization of Isobutene and α-Methylstyrene, Gary L. Driscoll and David L. Kerr. |
| 053,268 (abandoned 7-23-71) | 7-6-70 | Phosphorous Compounds Promoted Oligimerization of Isobutene, Gary L. Driscoll. |
| 056,680 | 7-20-70 | Reaction of Alkyladamantane Compounds to Form Products Having Two Linked Nuclei, Robert E. Moore and Abraham Schneider. |
| 078,190 (now U.S. 3,737,477, issued 6-5-73) | 10-5-70 | Process of Preparing Synthetic Lubricants From Low Molecular Olefins, Richard S. Stearns, Irl N. Duling and David S. Gates. |
| 078,191 (now U.S. 3,676,521, issued 7-11-72) | 10-5-70 | Synthetic Lubricants From Low Molecular Weight Olefins, Richard S. Stearns, Irl N. Duling and David S. Gates. |
| 080,779 | 10-14-70 | Reaction of Normal Paraffins With Adamantane Compounds, Robert E. Moore. |
| 091,183 | 11-19-70 | Reaction of Naphthene Hydrocarbons With Adamantane Compounds, Robert E. Moore. |
| 116,841 | 2-19-71 | Lubrication of Controlled-Slip Differential, David S. Gates, Paul E. Hagstrom and Marcus W. Haseltine, Jr. |
| 116,985 | 2-19-71 | Lubricant for Controlled-Slip Differential, Thomas D. Newingham, Alexander D. Recchuite, John Q. Griffith, III and Marcus W. Haseltine, Jr. |
| 133,637 | 4-13-71 | Combination of Tractive Drive and Traction Fluid Comprising Saturated Cyclic Compounds, Irl N. Duling and Frederick P. Glazier. |
| 134,095 (abandoned 5-7-72) | 4-14-71 | Polymerization of Dialkyl Vinylidene Compounds to Oils, Gary L. Driscoll. |
| 135,295 | 4-19-71 | Chemical Reaction Products of Polyisobutylene, Gary L. Driscoll and Marcus W. Haseltine, Jr. |
| 137,556 | 4-26-71 | Chemical Reaction Product of Sulfur, Lard Oil and Polyisobutylene, Alexander D. Recchuite and Gary L. Driscoll. |
| 144,165 (now U.S. 3,715,313, issued 2-6-73) | 5-17-71 | Traction Transmission Containing Lubricants Comprising Gem-Structured Polar Compound, Marcus W. Haseltine, Jr. and Gary L. Driscoll. |
| 152,303 | 6-11-71 | Lubricant Comprising Gem-Structured Organo Compound, Gary L. Driscoll and Marcus W. Haseltine, Jr. |

The disclosure of all of the above-cited applications is hereby incorporated herein by this reference. In particular, these applications disclose blended lubricants which are useful in the present invention, additives which can be useful in such lubricants and processes for making individual components of such blends.

BACKGROUND OF THE INVENTION

This invention relates generally to the use of certain naphthenes, partially saturated precursers of naphthenes, hydrorefined mineral oils, polyolefins and branched paraffins as traction fluids. The invention also relates to certain novel traction fluids having good low temperature properties comprising a mixture of at least one branched paraffin having a high viscosity index with at least one naphthene having a low viscosity index and a high traction coefficient. Preferably the blend of the paraffin and the naphthene has an average molecular weight in the range of 170–1000, more preferably 220–375. More preferably, the paraffin has a high degree of gem branching and a glass transition temperature in the range of −120 to −50° C. and the naphthene has a glass transition temperature (Tg) in the range of −90 to −30° C. The blended fluids of the present invention can contain any of the high traction naphthenic or partially saturated cyclic compounds described in U.S. Pat. Nos. 3,411,369 and 3,440,894. The blended fluids of the present invention can, in general, be superior in fluid and/or other lubricant properties (such as viscosity index) to the high traction components described in these two patents; furthermore, the process of such blending can allow for more flexibility in choice of tractants for a given application. For example, a high traction component which has poor or unacceptable viscosity properties can be incorporated in a blend, as with a polyisobutylene oil, to produce a useable fluid having good traction and good fluid properties.

The glass transition temperature is further described, for example, by Stearns, Duling and Johnson at pages 306–313, *Ind. and Eng. Chem.*, Volume 5, December 1966 in the paper "Relationship of the Glass Transition Temperature to the Viscosity-Temperature Characteristics of Lubricants."

The invention will be described more particularly in connection with the combination of a power transmission system comprising a traction drive and as a lubricant therefor, a composition comprising a hydrocarbon base stock boiling mainly in the lube oil range and having a kinematic viscosity at 210° F. in the range of 1.5–200.0 cs., said base stock comprising at least one hydrocarbon corresponding to a perhydrogenated polymer, copolymer or terpolymer of styrene, α-methyl styrene, β-methyl styrene and alkyl, cyclohexyl and alkyl-cyclohexyl derivatives of said perhydrogenated polymer, copolymers, or terpolymers.

Fluorine-substituted derivatives of any of the above hydrocarbons, wherein an average of from one to all of the hydrogen of the hydrocarbon is replaced by fluorine are also useful as traction fluids or components thereof, but are too expensive for most applications.

It is to be understood, however, that in addition to the naphthenes and the branched paraffins described hereinafter (or fluorine-substituted derivatives thereof), such a lubricant can also contain other oils and additives (e.g., from 5 to 50 weight percent) such as an antifoam, a phosphorus-containing friction improver, a viscosity index improver (as a high molecular weight polyisobutylene), a pour point depressant (as a fluorine-containing, saturated polymeric olefin), a corrosion inhibitor (e.g., the alkylene glycol-pentaborate salt types), an anti-oxidant and a sludge dispersant. An especially useful additive, combining detergency, corrosion inhibition and friction improvement at high speeds, is a Mg, Ca or Ba salt (especially a super-based salt) of a weak acid or a partial ester of a weak acid, as thiophosphoric acids, phenols, diesters of phosphoric acid, sulfonated alkyl aromatic hydrocarbons and the like (e.g., super-based barium salts of dithiophosphoric, acid calcium alkyl phenates, and calcium salts of mahogany acids). In general, suitable additives are those having a "Friction Ratio" at 600 ft./min. (or higher) greater than 0.8 (preferably greater than 0.9). See Rounds, *F. G. J. C. & E Data*, 5, #4, 499–507 (1960), and the polar compounds described in the aforementioned applications of Driscoll and Haseltine, Jr. When the lubricant is applied in mist or aerosol form, the lubricant can contain, to improve reclassification or reduce stray fog, an effective amount (e.g., 0.01–2 weight percent of polymer) of a polymeric additive selected from one or a mixture of acyclic, methacrylic, olefin (e.g., isobutylene) and styrene (e.g., alpha-methylstyrene) polymers having a viscosity average molecular weight in the range of 10,000–2,000,000 (preferably 100,00 to 500,000). Such additives are described in commonly-owned, copending application Ser. No. 140,398 filed May 5, 1971 of Amaroso-Coppock-Newingham-Williams, entitled "Mist Lubricant Containing Polymeric Additive."

The art has long recognized a need for fluid lubricants having high dynamic coefficients of friction (e.g., greater than those possessed by naphthenic lube oils), and which are noncorrosive and are sufficiently stable to retain these properties under the severe stress to which such fluids are subjected during use.

Such "traction fluids" are important components of variable speed power transmission systems which utilize a traction drive or a friction clutch. In particular, the fluids of the present invention are useful in a traction transmission such as that of the attached drawings (Labelled FIG. 1 and FIG. 2) and those shown in the following publications and United States patents:

| | |
|---|---|
| 1,867,553 | 3,184,990 |
| 2,549,377 | 3,225,617 |
| 2,871,714 | 3,268,041 |
| 3,006,206 | 3,301,364 |
| 3,115,049 | |

Kraus, C. E., ASME—Paper 65—Md—30 (For New York, N.Y. Meeting, May 17–20, 1956).

Hewko, L. O., AIAA Paper 67–429 (For AIAA 3rd Propulsion Joint Specialist Conference, Wash., D.C. July 17–21, 1967).

Such blended fluids are also useful in a controlled-slip differential (see the previously cited application of David S. Gates, Paul E. Hagstrom and Marcus W. Haseltine, Jr.).

The traction coefficient, or the dynamic coefficient of friction, which is one measure of the tractive capacity of a contact, can be defined as the ratio of the tangential force to the normal load under rolling-spinning motion. The limiting value of the coefficient of traction is the coefficient of traction at slip, which is observed when the rolling contact is on the verge of gross slip. In a given torque friction drive, coefficient of traction can be computed by knowing the normal load on the contact and by simultaneously measuring the input and output torques.

The essential qualifications of a friction gear transmission fluid comprise especially a high traction coefficient (which an ordinary lubricant does not possess), and an extremely high thermal stability and resistance to oxidation so as to minimize the necessity for fluid replacement. Another property which a torque converter fluid must exhibit is minimum sludging. Usually, those fluids which have been found to possess high traction coefficients in reference to steel on steel and also which have satisfactory stability and resistance to oxidation generally have high pour points and low viscosity indexes (VI) (e.g., −50 to −400 ASTM–VI); therefore, most traction fluids are not suitable for use at low temperatures. There is a special need for traction fluids having a high viscosity index, particularly for an ASTM–VI or VTF–VI greater than 40, and with a traction coefficient equal to or better than that of ASTM Oil No. 3.

Although there is not known means of predicting from structural or other chemical considerations whether a given fluid will be satisfactory for use as a lubricant in a traction drive, a fluid can be tested for an indication of its suitability as a traction fluid by utilizing such equipment and procedures as are described by Almen, J. O. in U.S. Pat. 2,045,555 or by Rounds, F. G. *Journal of C&E Data, 5, #,* pp. 499–507 (1960), and *ASLE Transactions, 7,* 11–23 (1964). Of particular interest is the research traction test machine of Hewko, L. O. et al., in *Proceedings of the Symposium on Rolling Contact Phenomena,* pp. 157–185 (1962), Elsevier, Amsterdam, Netherlands. The torque measurement by a Roxana 4-ball tester can also be used to compare traction properties of various fluids.

As is noted in the Hewko paper, the fatigue life of a rolling contact element of a friction drive is inversely proportional to the third power of the load whereas the torque capacity is only directly proportional to the load. As a result, increasing the torque capacity through increasing the coefficient of traction is far more desirable than through increasing the normal load.

A comparatively small difference in traction coefficient can correspond to a large improvement in lubrication. For example, a 10% increase in the traction coefficient of the lubricant will increase the durability of the transmission by about 50%.

The coefficient of traction at a given r.p.m., temperature and contact pressure can vary somewhat depending upon the type of test equipment. Most of the traction fluids reported in the literature as having acceptable fluidity and traction properties are not specific chemical compounds of known purity and good stability. Therefore, it is difficult to reproduce or correlate the work reported by various investigators. A pressing need in this area is a "standard traction fluid" which can be used to correlate traction tests done in various types of transmission and test apparatus. ASTM Oil No. 3 can be used as such a standard.

1,3-(5,7 - dimethyl)adamantyl dipelagonate (hereinafter sometimes DMAP) can also be useful as a standard traction fluid because it is readily prepared in high purity, has excellent stability, and has traction properties which are comparable to those of better naphthenic lube oils of the prior art (such as ASTM Oil No. 3). In addition, DMAP is more useful than those naphthenic lubes, as a traction fluid or as a component of a traction fluid, for traction drive automatic transmissions, because it has fluid properties (such as VI) which are greatly superior to those of the usual naphthenic lube oils (e.g., ASTM VI 95 v/s–11 for ASTM Oil No. 3). The preparation of DMAP is disclosed in U.S. Pat. 3,398,165, issued Aug. 20, 1968.

In general (except for oils having a viscosity at 210° C. below 2 cs.), if a fluid is to be useful as a lubricant for a given type of traction transmission, that fluid must have a traction coefficient in that particular transmission which is at least as high as the traction coefficient which ASTM Oil No. 3 has in the same transmission at the same test conditions. Therefore, one means of comparing traction fluids is to report their traction coefficients in a particular test (or the average traction coefficient as in FIG. 1) as being $X\%$ higher or lower than that of ASTM Oil No. 3.

SUMMARY OF THE INVENTION

This invention relates to the use of certain fluids having high traction coefficients as lubricants for traction drive transmissions, and to the resulting novel power transmission systems comprising a traction drive transmission and, as a lubricant therefore, said high traction coefficient fluid. The invention also relates to certain novel hydrocarbon base stocks which are useful as lubricants for a traction drive transmission, particularly for the planetary, ring and cone or friction clutch drive types. The base stocks are also useful for lubricants for friction gears, such as a limited slip differential. The base stocks are also useful in lubricants for a Wankel engine (this utility being the invention of Richard J. Stenger and Paul E. Hagstrom, and will be the subject of a later filed patent application).

It has been found that fluid $C_{16}$–$C_{40}$ naphthenes containing a di(cyclohexyl)alkane or a hydrindan as a structural nucleus are especially useful as lubricants for friction (traction) drive transmissions, whether the drive is of fixed or variable ratio.

It was further found that an especially useful power transmission system comprises a fixed ratio, roller traction drive of the type described in the aforementioned AIAA paper of Hewko, or a variable ratio drive of the type shown in the attached drawing and labelled FIGS. 1 and 2, and as a lubricant therefor, a composition comprising a hydrocarbon base stock boiling in the lubricating oil range and having an ultraviolet absorbence at 260 millimicrons (260 UVA) below 0.5, said base stock containing, preferably, at least 10% by weight of a $C_{16}$–$C_{27}$ hydrindan. For example, a transmission system comprising the fixed ratio roller traction drive of the Hewko AIAA paper and, as a lubricant, a hydrocarbon base stock containing 45 volume percent of 1-cyclohexyl 1,3,3-trimethyl hydrindan (hereinafter, sometimes CHTMH), 5 volume percent of 2,4-(dicyclohexyl)-2-methylpentane (hereinafter, sometimes DCHMP), and 50 volume percent of a 5 cs. (at 210° F.) polyisobutylene oil wherein over 33% of the repeating units are of the gem-dimethyl configuration, permits the resulting power transmission system to operate at *double* the torque throughout of the better of the prior art fluids (naphthenic mineral oils) shown in the Hewko paper.

Additionally, it has been found that fluid $C_{13}$–$C_{40}$ naphthenes containing a spirodecane, spiropentane, perhydrofluorene, perhydrobiphenyl, perhydroterphenyl, decalin, norbornane, perhydroindacene, perhydrohomotetraphthene, perhydroacenaphthene, perhydrophenanthrene, perhydrocrysene, perhydroindane-1-spirocyclohexane, perhydrocarylophyllene, pinane, camphane, perhydrophenylnaphthalene, adamantane or perhydropyrene, as a structural nucleus, are useful as lubricants for traction drive transmissions. Partially saturated precursors of such naphthenes (such as those described in the applications of Haseltine, Jr. and Driscoll filed May 17, 1971 and June 11, 1971) can also be useful as such lubricants, particularly in the blended base stock. One such precursor is 3-cyclohexyl-1,1,3-trimethylindan.

In one novel and very useful embodiment, as is disclosed further hereinafter, certain adamantane hydrocarbons, and fluoro, carboxylic acid, keto, ether or ester derivatives of such adamantanes, are useful as traction fluids or components of traction fluids. In general, good traction properties appear to be a characteristic of compounds containing the adamantane nucleus or of those naphthenes or alkyl or cycloalkyl naphthenes which are capable of being converted to adamantanes by the Schneider reactions of U.S. Pat. 3,128,316 or the reactions of U.S. Pats. 3,275,700, 3,336,405 and 3,336,406. However, for better combination of traction properties, fluidity at 210° F. and low temperature properties, those naphthenes containing the hydrindane, decalin, perhydrophenanthrene, cyclohexyl, perhydroterphenyl, perhydroacenaphthene, adamantane or perhydrophenalene nucleus are a preferred group of perhydroaromatics. Fluorinated derivatives of these perhydroaromatics wherein an average of from 1 to all of the hydrogen of the hydrocarbon is replaced by fluorine are also useful as traction fluids or as components of traction fluids. Such fluoro-derivatives are also useful as refrigerants or as a fluid in a Rankin cycle engine. The fluoro-derivatives can be prepared by the processes in Ser. No. 440,614.

Generally, those naphthenes having the lower viscosity index (particularly below an ASTM-VI of 0—except where the structural nucleus is phenanthrene or adamantane) will have the higher traction coefficients. These naphthenes can be so used per se, or they can be compounded with additives, such as a dispersant or an antioxidant, or with certain hereinafter described paraffin hydrocarbons or hydrogenated lube oils in order to alter the fluid properties of the resulting lubricant (which, depending upon the desired end use, can be as fluid at room temperature as a gas oil or as stiff as a bearing grease).

A preferred embodiment is a power transmission system comprising a traction drive transmission and as a lubricant therefor, a composition comprising a hydrocarbon base stock boiling mainly above 500° F. and having a kinematic viscosity at 210° F. in the range of 1.5–200.0 (preferably 1.8–20) cs., said base stock comprising a perhydrogenated trimer, dimer or codimer of (1) styrene
(2) α-methyl styrene,
(3) β-methyl styrene, or
(4) a mono- or dimethyl ring-substituted derivative of (1), (2), or (3).

To control fluid loss, it is preferred that the base stock boil no lower than in the gas oil range, more preferably the base stock should boil in the lube oil range. Broadly, the oil should boil mainly above 500° F. and, preferably, mainly above 600° F. and (except in greases) have a 90% point below 950° F. Distillation of such stocks is preferably conducted at reduced pressure (as below 5 mm. Hg) including vacuum-steam distillation, to avoid thermal decomposition. Traction greases can be compounded from such base stocks using conventional additives (e.g., soaps).

However, the soap thickeners (e.g., lithium stearate, sodium palmitate, etc.) used in conventional mineral oil greases are fairly good lubricants. The soap can cause, at least to some degree, a reduction in the high friction built into the traction fluid. Therefore, the preferred traction greases are made from non-soap thickeners. Examples of non-soap thickeners are colloidal silica (e.g., Cab-o-sil), a treated clay (e.g., Baragel); clay (e.g., Montmorillanite with surface activation performed in situ); very fine asbestos and colloidal graphite.

The following Roxana Four Ball Test results show the improvement in traction which is obtained by greases prepared according to this invention, which is the invention of Richard J. Stenger, C. Robert Knott and Arthur T. Polishuk and will be the subject of a later-filed application:

| Composition—Base oil, percent—thickener, percent | Relative torque transfer, 4 ball test | 60 stroke PEN |
|---|---|---|
| Traction, none | 0.0 | 76.33 |
| Traction, Al Soap | 3.4 | 78.2 | 285,275 |
| Traction, Baragel | 5.5 | 99.5 | 305 |
| Traction, silica | 4.7 | 111.5 | 300 |
| Naphthenic oil, Baragel | 6.0 | 61.5 | 300 |
| Traction, graphite | 40.0 | | 11 |
| Traction, asbestos | 30.0 | 92.29 | 305 |

The "Traction" base oil comprised a blend of hydrogenated dimers and trimers, both primarily indan form, of α-methyl styrene and had a $KV_{210}$ of 11.18, $KV_{100}$ of 334.9, and ASTM-VI less than 0. Similar greases can be obtained using the blended base stocks of the present invention and non-soap thickeners.

A grease exhibiting such high traction has application wherever a fluid of high traction would be used but where other considerations make impractical the use of a fluid lubricant. An example is lubrication of the linear actuator, Rollguide, made by the Dumore Company of Racine, Wisconsin. Another example is lubrication of the high speed traction drives used with turbine dental drills; Miniature Precision Bearings of Keene, New Hampshire makes such a traction drive. Another example is in the lubrication of roller clutches, where reduced slip increases service life.

A traction fluid or such a grease prepared from a traction fluid, can be used as a lubricant in a cam, roller drive, clutch or any mechanism where the load is concentrated on a series of joints. With such a traction lubricant, service life of the device is increased by decreasing stresses.

Normally, the monomer-free perhydrogenated reaction products will contain components boiling mainly in the range of 100–250° C. at 0.5 mm. Hg. and the portion chosen for a particular base stock will be obtained by vacuum distillation to recover a fraction of the desired viscosity and flash point. Preferably, the flash point is above 160° F. and more preferably, above 250° F. The viscosity and/or viscosity index of our oils can also be adjusted by "dumbbell" blending, that is, adding controlled amounts of "light (lower boiling) ends and heavy (higher boiling) ends." However, as will be further disclosed hereinafter, in the case of fluids containing polyolefin oils it is preferred that dumbbell blending be avoided, since it has been found that the better combination of traction coefficient and viscosity index is frequently obtained by choosing a narrow boiling fraction of the desired viscosity, or by blending oils having similar, narrow boiling ranges.

Especially useful components of oils of higher viscosity are the naphthenes corresponding to perhydrogenated trimeric or tetrameric products which are normally present in minor amounts in our perhydrogenated styrene dimerizate but which can be concentrated in the distillation "bottoms" or in fraction boiling mainly above about 615° F. These trimers and tetramers can also be prepared in high yield by further polymerization of the dimerizate prior to perhydrogenation, especially when the dimerizate is polymerized with additional monomer.

The perhydrogenated dimer or codimer can preferably consist mainly of a $C_{16}$–$C_{22}$ cyclohexyl hydrindan or mainly of a $C_{12}$–$C_{29}$ di(cyclohexyl)-alkane and usually will consist of a mixture of isomers of both such structures. The structural formulae of the above-mentioned naphthenes is shown, for example, in U.S. 3,597,358, issued Aug. 3, 1971, of Duling and Gates.

Such a hydrocarbon base stock having an initial traction coefficient greater than that of ASTM Oil No. 3 at 600 ft./min., 200° F., 400,000 p.s.i. and comprising a blend of naphthenes with a polyolefin and/or hydrogenated petroleum or polyolefin oil can also contain (as in addition to the perhydrogenated dimer, trimer, and tetramer) up to 10 weight percent of aromatic compounds, (or naphthene precursers), such as naphthalenes, phenanthrenes, acenaphthenes, indacenes, hydrindacenes, fluorenes, phenyl indanes, phenylhydrindans and phenyl-alkyl cyclohexyl compounds. Occasionally such aromatics can be useful since they aid in dissolving certain additives in the fluid. However, to insure against degradation of the traction coefficient under the severe operation conditions encountered in a friction drive transmission, we prefer that the hydrocarbon base stock contain less than 5% of unsaturates, or more preferred be substantially free from olefinic and aromatic unsaturation as evidenced by an ultraviolet absorbency at 260 millimicrons (260 UVA) of less than 0.5 and an iodine number less than 5.

When the numerical values reported herein for the traction coefficients of various fluids are compared with the values of other researchers, the values should be adjusted by using the values hereinafter cited for ASTM Oil No. 3 or those for DMAP as the standardization point.

When the hydrocarbon base stock of our invention consists essentially of naphthenes corresponding to perhydrogenated styrene oligomers (e.g., trimers or dimers of alkyl derivatives thereof), the base stock has a low viscosity index, and, therefore, has poor low temperature properties, such as the pour point. It has been found, surprisingly, that novel traction fluids having a traction coefficient at least 10% greater than that of ASTM Oil No. 3 (at 600 feet per min., 200° F., 400,000 p.s.i.) and having as ASTM viscosity index greater than 40, can be prepared by blending certain branched paraffin hydrocarbons with the perhydrogenated styrene dimer or trimer fluids.

It has been found, surprisingly, that a particularly useful power transmission system comprises a friction drive transmission and, as a lubricant therefore, a hydrocarbon base stock having a 260 UVA below 0.5 and comprising at least one substituted $C_{16}$–$C_{22}$ cyclohexyl hydrindan having the structure

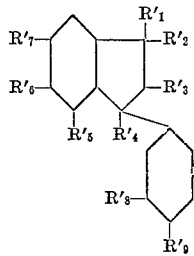

wherein $R'_1$ is methyl or ethyl and can be different or the same, and $R'_2$, $R'_3$, $R'_4$, $R'_5$, $R'_6$, $R'_7$, $R'_8$ and $R'_9$ are hydrogen or methyl and can be different or the same, said hydrindan being present in an amount of at least 5 percent by weight of the base stock and wherein there is present from 0.1–20 parts by weight, based on said hydrindan, of a branched paraffin corresponding to a fully hydrogenated liquid $C_4$, $C_5$, $C_6$ or $C_7$ olefin polymer, copolymer, or terpolymer. Preferably said olefin comprises isobutylene, 3-methylbutene-1, 4-methylpentene-1, or 2,3-dimethylbutene-1. More preferably at least 33 percent (most preferably 90–100%) of the repeating units (exclusive of terminal methyl groups) of said olefin polymer have the repeating structure

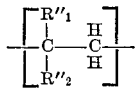

where $R''_1$ is hydrogen or methyl, and when $R''_1$ is hydrogen, $R''_2$ is isopropyl or isobutyl, and when $R''_1$ is methyl, $R''_2$ is methyl, ethyl, isopropyl or isobutyl. We also prefer that the average number of branches per molecule be greater than 3 (with the gem configuration considered as two branches).

Preferred polyolefins are those of the aforementioned applications of Driscoll, of Driscoll and Haseltine, Jr. and of Driscoll, Duling and Gates.

For example, the olefin polymer can have an average molecular weight from 170–1000 when at least 33 percent, and more preferably at least 50%, of the repeating units of the polymer (exclusive of end groups) have the repeating structure

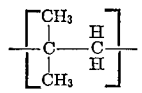

Especially advantageous with such a paraffin (which can be obtained by partial or complete hydrogenation, of a polyisobutylene or of a copolymer or terpolymer of isobutylene with other butenes) is a fluid wherein said hydrindan consists of isomers of 1-methyl, 3-cyclohexyl-hindrindan, or 1-cyclohexyl, 1,3,3-trimethyl hydrindan, or mixtures thereof. Also advantageous are blends of such a parafin with a dicyclohexyl alkane or a higher "dumbbell" oligomer of a styrene.

The nuclear magnetic resonance (NMR) spectrum of a more preferred, highly geminally branched paraffin oil will have a greater peak contributed by the crowded methylene group (at about 8.58τ) than the peak contributed by uncrowded methylene groups (at about 8.85τ). See Bartz, K. W., and Chamberlain, N. F., *Analytical Chem.*, 36, #11, 2151–8 (1964) or Warren et al., *J. Poly. Sci.* part A–1, vol. 9, pp. 717–745 (March 1971). Branched paraffin oils having such a high degree of methylene crowding and a lower degree of uncrowded methylene grouping, are not found to any substantial degree in refined naphthenic or paraffinic petroleum oils.

Preferably the novel hydrocarbon base stock, comprising a blend of at least one $C_{13}$–$C_{40}$ naphthene and at least one branched paraffin, has a viscosity in the range of 1.8 to 20.0 cs. at 210° F., a VTF–VI greater than 40, and a traction coefficient at least 10% greater than that of ASTM Oil No. 3 at 600 feet per minute, 400,000 p.s.i. and 200° F. Of special value is such a hydrocarbon base stock containing from 5–50% by weight of isomers of 1-cyclohexyl-1,3,3-trimethyl hydrindan (especially, 4,9-Cis, 1-cyclohexyl-1,3,3-tri-methyl hydrindan), and from 1–18 parts of an isobutylene polymer or copolymer per part by weight of hydrindan. Especially useful isobutylene polymers are those of Driscoll, Duling and Gates, U.S. Ser. No. 52,301.

Other useful $C_{16}$–$C_{22}$ alkyl hydrindans are shown in U.S. 3,597,358.

BRIEF DESCRIPTION OF THE DRAWINGS

In the attached drawings

FIGS. 3 and 4 of copending application Ser. No. 679,833, filed Nov. 1, 1967, of Duling and Gates, now U.S. 3,597,385, issued Aug. 3, 1971 present points representing experimentally determined traction coefficients and viscosity temperature function-viscosity indexes (VTF–VI) of a number of hydrocarbon fluids. The scattering of these points illustrates the unpredictability, based on chemical composition above, of the suitability of a particular fluid as a lubricant for a traction transmission. The points and the curves contained on the figures illustrate the generality that a fluid having a high coefficient of traction tends to have poor low temperature properties. The curves of the two figures also aid in illustrating the discovery that certain fluids have a higher coefficient of traction than other fluids of about the same VTF–VI.

Figure 2:
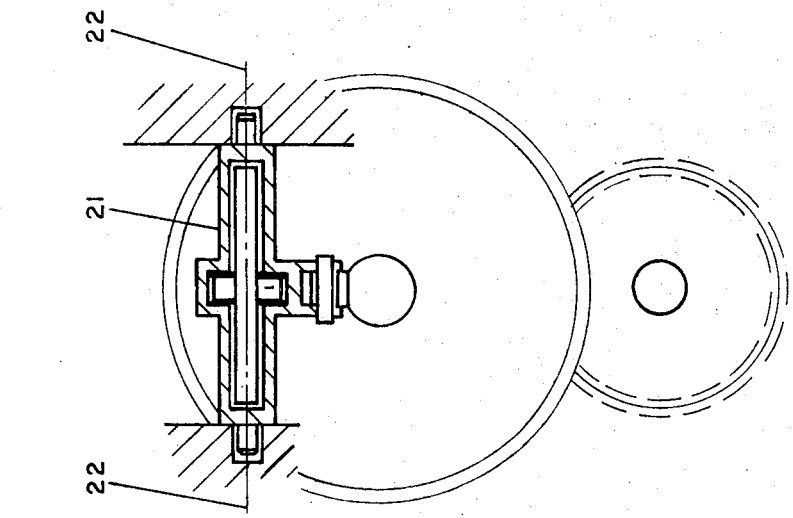
FIGS. 1 and 2 represent, respectively, a side view in cross-section and a partial front view in cross-section of a power transmission system comprising a torric traction drive transmission and a lubricant therefor, containing one of the blended traction fluid base stocks of the present invention.
Figure 1:
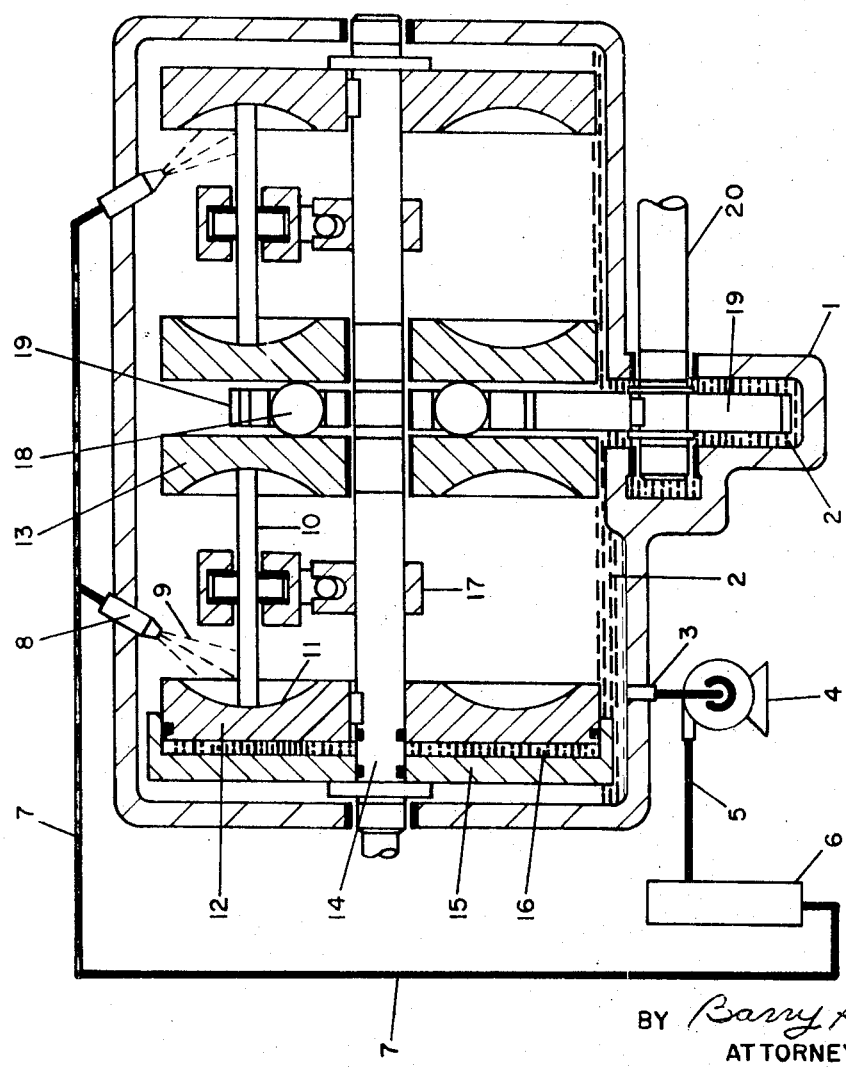

The power transmission system illustrated in FIGS. 1 and 2 is suitable as a continuous automatic variable speed power transmission for automotive use. The torric traction transmission of the figures is similar to that described in Hewko et al., "Tractive Capacity and Efficiency of Rolling Contacts," *Proceedings of the Symposium on Rolling Contact Phenomena,* Elsevier, Amsterdam, 1962, pp. 159–161. The power transmission system containing a traction fluid of the present invention comprises a torric drive transmission 1, the traction fluid 2, means, such as a drain 3, a pump 4, and a line 5, to remove said fluid from said transmission and circulate it through a heat exchanger 6 (as an automotive-type radiator), in order that the temperature of the fluid 9 entering the transmission be kept (preferably) below 230° F. (more preferably no higher than 200° F.), and means, such as line 7 and spray nozzle 8, for returning the cooled fluid to the interior of the drive unit.

In operation of the drive unit illustrated in FIGS. 1 and 2, spheroidal steel rollers 10 running on toroidal steel braces 12 and 13 mounted on suitable shafting 14 and 20 are the principal power transmitting components. The toroidal drive in FIGS. 1 and 2 consists of two identical sections transmitting torque in parallel. Each section consists of an input race 13, an output race 12, and three rollers, only one of which 10 can be seen in FIG. 1. Rollers of each section are spaced 120° apart and ⅓ of the input torque is transmitted by each roller. Both input faces 11 are free to rotate on the output shaft 14 whereas both output races 12 are splined to it. Contact load is applied hydraulically by the piston 15 through a hydraulic fluid 16. The double section arrangement makes the thrust force resulting from the contact load self-contained and eliminates having the ground and thrust through a high capacity thrust bearing. In FIG. 1 the surface of the roller which is in contact with the input face is shown as having the same radius of curvature as that of the face. Such configuration presents a most difficult lubrication problem. Lubrication is greatly facilitated when the radius of curvature of the contact surface of the roller is less than the radius of curvature of the input face (see U.S. 1,867,553).

The cooled traction fluid 9 which acts as a lubricant and coolant for the drive is supplied through one or more spray nozzles 8 which are preferably directed toward the contact area between the steel roller and the race. Circulation of the lubricant throughout the drive unit is accomplished by splash effect. That is, the bottom section of the casing which houses the differential driver gear 19 acts as a sump for fluid which is circulated to the differential ball bearings 18 as the gear rotates.

A change in ratio is accomplished by tilting all rollers about an axis 22 and thus changing the effective radii of the input and output races. Tilting of the rollers can be accomplished by inclining the rollers through some angle about an axis through the race contacts, thus, steering the rollers into the desired ratio position. The ratio between the two sections is kept constant by locking the two synchronizing collars 17 in a position that makes the speeds of both input races identical. The input races are driven through a ball differential 18 by the differential driver gear 19 mounted on the input shaft 20. This arrangement equalizes the torque between the two sections and permits both the input and output shafts to have the same direction of rotation.

It can be seen that an important requirement of a traction fluid for use in such an automotive transmission system is that it not only has good traction properties, but also is a good lubricant for the differential gear and differential ball, and a good lubricant for the rollers and races. Although such a traction fluid could also be used as the hydraulic fluid 16 in the unit, it is preferred that the hydraulic fluid contain an indicator means, such as a distinctive dye, so that leakage of the hydraulic fluid into the main body of the drive unit can be detected by inspection of the main body of traction fluid, such as by a dip-stick arrangement.

To prevent loss of fluid by vaporization and to insure against introduction of contaminants into the fluid, the transmission system should be fully enclosed and well sealed. With the more volatile fluids, the seals and system should be capable of withstanding pressure exerted by the vaporized portion of the fluid at operating temperatures.

FURTHER DESCRIPTION OF THE INVENTION

The perhydrogenated aligomers of styrene, α-methyl styrene, β-methyl styrene and mono- and dimethyl ring-substituted derivatives thereof which are useful in the present invention can be obtained by conventional addition polymerization, as by the dimerization of styrene in aqueous sulfuric (see Rosen, M. J., J. Org. Chem. 18, 1701 (1953)), followed by high pressure hydrogenation (at least 1000 p.s.i.g., preferably in the range of 2000–10,000 p.s.i. of $H_2$), as with Raney nickel catalyst at 200° C. and 3000 p.s.i. of hydrogen. They may also be obtained by polymerization of a vinyl cyclohexane or by hydrogenation of the polymerization product of vinyl cyclohexene or of an alkyl substituted vinyl cyclohexene or by the hydrogenation of the product of the copolymerization of a mixture of vinyl cyclohexenes (including alkyl derivatives thereof), such as by the methods shown in U.S. 2,543,092. Also useful is the hydrogenated vinyl cyclohexene dimer of U.S. 2,590,971.

Further description of such perhydrogenated oligomers and processes of their manufacture can be found in U.S. 3,595,796, issued July 27, 1971, the disclosure of which has been incorporated herein by reference.

Our hydrocarbon base stock boiling mainly above 500° F. having a viscosity above 3 cs. at 210° F. and containing at $C_{13}$–$C_{40}$ naphthene is useful as a lubricant for a traction drive transmission due to the high traction coefficient and the good stability of such a hydrocarbon base stock when subjected to prolonged use in such a transmission; however, such a power transmission system can be limited to applications wherein temperatures lower than about 0° F. are not encountered, such as in submarines or in naval vessels, or for industrial transmissions which are kept in buildings where the temperature is maintained above about 0° F., and preferably above about 40° F. Such a lubricant can, of course, be used in a transmission which will be exposed to temperatures below 0° C., if the oil is maintained at a higher temperature (as by a heater).

For low temperature use where extremely high fluid pressures are encountered (as in pressure-equalized external submarine transmissions) a fluid of less than 2 cs. at 210° F. and having somewhat lower traction coefficient can be useful. Examples of such low viscosity fluids are shown in U.S. 3,595,796.

For automatic variable speed traction drive automotive transmissions, where weight, cost and simplicity of assembly assume high importance and where temperatures as low as −40° C. can be encountered, it is preferred that the lubricant used for the automotive transmission have a viscosity of no greater than about 7000 cs. at −20° F. and have a pour point no higher than about −40° F. Therefore, such a fluid must have a high viscosity index (preferably above 40 VTF–VI and more preferably above 75) and have a viscosity at 210° F. in the range of 3–15 cs.

As the viscosity index of an oil increases, its traction coefficient generally decreases. This relationship is particularly striking when the traction coefficient and the VTF–VI of hydrogenated poly-1,3(3-methylbutene-1), Oil 31, is compared with hydrogenated poly(1-Octene).

For an explanation of the viscosity-temperature function (VTF) and the desirability of using the VTF in the determination of the viscosity index of an oil (e.g. the VTF–VI), see Wright, W. A., *ASTM Bull.* #215, July 1956, p. 84–86 (TP 140–142) and Stearns, R. S., et al., *ICEC Product R & D*, Vol. 5, December 1966, pp. 306–313.

Paraffin oils possessing a high proportion of repeating units having the structural formula

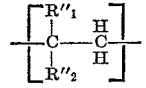

wherein $R''_1$ is hydrogen or methyl and when $R''_1$ is hydrogen, $R''_2$ is i-propyl or i-butyl and when $R''_1$ is methyl, $R''_2$ is methyl, ethyl, isopropyl or isobutyl, have a higher traction coefficient for a given viscosity index than do the other paraffin oils.

One embodiment of the present invention is a power transmission system comprising a traction drive transmission, and as a lubricant therefor, a composition comprising a hydrocarbon base stock having a kinematic viscosity at 210° F. in the range of 1.8–20.0 cs., said base stock comprising at least one branched paraffin wherein at least 33% of the repeating units of said branched paraffin have the structure

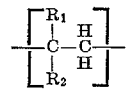

wherein $R_1$ is hydrogen or methyl and $R_2$ is isopropyl or isobutyl. Preferably, the average number of branches per molecule is greater than 3 (with the isopropyl or isobutyl $R_2$ considered as two branches). Such highly branched paraffins are not found to any appreciable extent in refined petroleum oils. Such a power transmission system is particularly advantageous when said branched paraffin has a pour point below 0° C. and an average molecular weight in the range of 188–560. It is preferred that at least 90% of the repeating units, exclusive of terminal groups, of the branched paraffin have said structural configuration. An especially preferred embodiment of our invention comprises a traction drive transmission and a lubricant comprising at least one such branched paraffin where $R_1$ is hydrogen when $R_2$ is isobutyl, and when $R_1$ is methyl, $R_2$ is isopropyl (see U.S. 3,595,796).

Synthetic liquid $C_3$–$C_8$ olefin polymer, copolymer or per-polymer oils which can be hydrogenated to produce a branched paraffin fluid useful as a component for blending with our naphthene hydrocarbons in order to produce an improved hydrocarbon base for lubrication of traction drive transmissions can be obtained in the manner shown in the following patents and publication: U.S. 3,156,736; 2,993,942; 2,360,446; 2,327,705; 3,007,452; 3,090,822; 2,965,691; 2,224,349; 3,100,808; 1,395,620; 2,500,166; Belgian 663,550; 663,549, *Industrial and Engineering Chemistry*, Vol. 23, No. 6, p. 606–7. Note that U.S. 1,395,620 and 2,500,166 teach that, under some polymerization conditions, butenes can be converted to naphthenes. Regarding Decalins, see U.S. 2,203,102.

Other preferred branched paraffin components and their manner of preparation are shown in U.S. 3,595,796 and Ser. No. 052,301.

Other oils which are useful as traction fluids or as components of traction fluids (particularly as a third component of our perhymer-branched paraffin blends) are obtained by perhydrogenation of the mixtures of as-hydrindacenes and indanyl phenyl alkanes which are obtained when indans are contacted with HF and $BF_3$ in liquid phase at 10–110° C. For example, as is shown in U.S. Serial No. 388,693 of Ronald D. Bushick, filed Aug. 10, 1964, indan can be contacted with HF and $BF_3$ to produce benzene, as-hydrindacene and 1-(2-indanyl)-3-phenylpropane.

Preferably, the lower boiling components (e.g., benzene and unreacted indan) are removed, as by distillation, prior to perhydrogenation. Similarly, a useful component of a blended traction fluid is obtained by perhydrogenation of the reaction mixtures obtained by contacting octahydroanthracene or octahydrophenanthrene in the presence of an acid catalyst, such as $HF \cdot BF_3$ or a crystalline zeolite catalyst, as in United States Patent 3,396,203 of Ronald D. Bushick, issued Aug. 6, 1968.

Also useful as a third component of the naphthene-branched paraffin fluids is from 5–50% of a perhydrogenated poly-1-octene oil having a VTF–VI above 80, preferably above 100.

It is sometimes advantageous to insure that the base stock is free from surface active constituents which can reduce the traction coefficient of the lubricant. One useful method of removing such surface active constituents is that of U.S. 2,897,144, which comprises foaming the oil (or a portion thereof) with a non-reactive gas and separating the resulting foam from the bulk of the oil.

Another embodiment of the invention comprises a traction drive transmission and as a lubricant therefor, a composition comprising a hydrocarbon base stock having a kinematic viscosity at 210° F. in the range of 1.5–200.0 cs., said base stock comprising a $C_{12}$–$C_{30}$ Decalin containing as substituents at least 1 member selected from the group consisting of $C_1$–$C_5$ alkyl, $C_5$–$C_6$ cycloalkyl, and $C_6$–$C_{10}$ alkylcyclohexyl and alkylcyclopentyl. For example, any of the alkylnaphthalenes of U.S. 2,549,377 or U.S. 2,626,242 (including hydrocarbon base fluids which contain such alkylnaphthalenes) can be converted to an alkyldecalin fluid by severe hydrogenation (at hydrogen pressures greater than 1000 p.s.i., preferably greater than 1500 p.s.i. and more preferably from 3000–10,000 p.s.i.).

The resulting Decalin fluid can contain up to 10% of residual aromatics (by gel) but, preferably, should contain less than 1% of gel aromatics based on the Decalin and have a 260 UVA less than 0.1. Such traction fluids containing Decalins have a better combination of fluid properties and traction properties and have a longer effective life when used in a traction transmission than do the alkylnaphthalene fluids of the aforementioned patents. One such Decalin is tetraisopropyldecalin.

A novel and preferred type of such a hydrocarbon base stock, useful as a lubricant when contained in a traction drive transmission, has a VTF–VI greater than 40 and a traction coefficient greater than that of DMAP at 600 ft./min., 400,000 p.s.i. at 200° F., and comprises such a Decalin having a glass transition below −30° C. and from 0.1–20 parts by weight, based on the total naphthene content of said base stock, of at least 1 fully hydrogenated, synthetic liquid $C_3$–$C_8$ olefin polymer, copolymer, or terpolymer.

An especially useful hydrocarbon base for a traction fluid can be obtained by severe hydrogenation of a refinery stream containing a high percentage of alkylnaphthalenes. Examples of such an alkylnaphthalene-containing refinery stream (and means of concentrating selected fractions) are shown in U.S. 3,595,796.

Both the traction properties and fluid properties of the conventional petroleum oils which normally contain from 15–60% gel aromatics or of the usual hydrotreated and/or acid treated and/or solvent treated naphthenic oils (which can contain as little as 5% gel aromatics) can be improved by severe hydrorefining so as to minimize or eliminate the presence of aromatics hydrocarbons in said oils.

The usual hydrotreating has little or no effect on the traction properties of a naphthenic oil, however, if the hydrogenation is so severe as to virtually eliminate the presence of aromatic hydrocarbons in the resulting hydrogenated oil, the traction properties will be significantly improved (perhaps due to the type of naphthene to which the aromatics are converted). This discovery is illustrated in Tables I, II, and III of U.S. 3,595,796.

Residual aromatics (e.g., less than 1%) can be removed by contacting the severely hydrogenated distillate with silica gel. The resulting completely hydrogenated naphthenic distillate contains more than twice the weight of naphthenes (a total of about 70% naphthenic carbon atoms) than is found in the usual hydrorefined naphthenic oil.

In our severely hydrorefined naphthenic oils, at least 15% (preferably over 25%) by weight of the naphthenes contained therein will result from perhydrogenation of the aromatics contained in the oil prior to hydrogenation.

In another embodiment a saturated naphthenic traction fluid is prepared by severe hydrogenation (to less than 1% gel aromatics) of a naphthenic distillate (or an acid refined or solvent refined naphthenic oil) or a hydrorefined naphthenic distillate, containing at least 10% gel aromatic hydrocarbons and having a kinetic viscosity at 210° F. less than 3.0, and preferably less than 2.5 cs. Such fluids are especially useful, due to their low initial viscosity, as traction fluids in external submarine drives. For example, such an oil is obtained by severe hydrorefining of a 50 SUS (at 100° F.) naphthenic distillate containing 40% aromatics, and having a 260 UVA of 5.4.

Such a severely hydrogenated light naphthenic distillate can also be blended with perhydrogenated oligmer oils (such as the perphoydrogenated hydrindan-trimer of α-methyl styrene), as is illustrated by Oil 51 in Table II of U.S. 3,595,796. Our severely hydrogenated naphthenic oils can be distinguished from the naphthenic oils of Rounds in *J. C&E Data*, Ibid., in that our oils contain more than 50%, and preferably more than 75% of naphthenic hydrocarbons (by the method of vanNes and vanWesten) and contain less than 2% of aromatic hydrocarbons.

Other embodiments of the invention involve the discovery that fluid $C_{18}$–$C_{40}$ naphthenes containing a perhydroterphenyl, or fluid $C_{13}$–$C_{25}$ naphthenes containing perhydrofluorene as a structural nucleus, are useful as lubricants for traction drive transmissions, whether the drive is of a fixed or variable ratio.

The perhydrogenated terphenyl and fluorene compounds which are useful in the present invention can be obtained by conventional synthesis as by the hydrogenation of terphenyls, fluorene or substituted fluorenes or terphenyls, or partially hydrogenated derivatives thereof, as with Raney nickel catalyst at 200° C. and 3000 p.s.i. of hydrogen. The substituted fluorene derivative can be in relatively pure form, or can be present in concentrations as low as 10% in distillate fractions from petroleum refining or petrochemical manufacture.

One embodiment is an especially useful power transmission system comprising a fixed ratio, roller traction drive of the type described in the aforementioned AIAA paper of Hewko, or a variable ratio drive of the type shown in the attached drawings labelled FIGS. 1 and 2, and as a lubricant therefor, a composition comprising a hydrocarbon base stock boiling in the lubricating oil range, having a viscosity at 210° F. in the range of 2.0–12.0 cs., and having an ultraviolet absorbance at 260 mM (260 UVA) below 0.5 (perefarbly below 0.1), said base stock containing at least 5%, preferably at least 10 percent, by weight of a $C_{18}$–$C_{26}$ perhaydroterphenyl or a $C_{13}$–$C_{25}$ perhydrofluorene. For example, a transmission comprising the fixed ratio roller traction drive of the Hewko AIAA paper, and as a lubricant, a hydrocarbon base stock containing 10 volume percent of perhydrofluorene and 90 volume percent of a 5 cs. (at 210° F.) polyisobutylene oil wherein over 33 percent of the repeating units are of the gem-dimethyl configuration, permits the resulting power transmission system to operare at a higher torque throughput than with the better of the naphthenic mineral oils shown in FIG. 3, at page 4, of the Hewko paper.

A preferred embodiment of our invention is a power transmission system comprising a friction drive transmission, and as a lubricant therefor, a composition comprising a hydrocarbon base stock boiling mainly above 500° F. and having a kinematic viscosity at 210° F. in the range of 1.5–200.0 (preferably 1.8–20) cs., said base stock comprising perhydrogenated orthoterphenyl or perhydrofluorene or a saturated, $C_{19}$–$C_{40}$ hydrocarbon substituted derivative of terphenyl or a hydrocarbon substituted derivative of perhydrogenated fluorene wherein said hydrocarbon substituent is selected from the group consisting of alkyl, cycloalkyl, and alkylcycloalkyl.

Perhydrofluorene (having an ASTM–VI of 105, a $KV_{210}$ of 2.5 cs. and a pour point less than 0° C.) and $C_{17}$–$C_{23}$ alkyl substituted derivatives thereof (e.g., the dimethyl derivatives) are also useful as components of traction fluids, as are perhydroacenaphthalenes. Preferred perhydrogenated acenaphthalene and fluorene derivatives can be obtained by perhydrogenation of the following fluorene compounds (or hydro-derivatives thereof):

1-(5-acenaphthyl)-butane
1-(5-acenaphthyl)-hexane
9-methylfluorene
9-(4-methyl-benzylidene)-fluorene
9-phenyl-fluorene
1,8-dimethyl-9-(2-tolyl)-fluorene
9-benzylidene-fluorene Preferred perhydrogenated terphenyl derivatives can be obtained by perhydrogenation of orthoterphenyl (or hydro-o-terphenyls) or $C_{19}$–$C_{24}$ methyl substituted-o-terphenyls or by hydrogenation of hydrocarbon streams containing at least 5% of o-terphenyl.

To control fluid loss, it is preferred that the base stock boil no lower than in the gas oil range, more preferably the base stock should boil in the lube oil range. Where the base stock boils mainly below the gas oil range, the fabrication of a transmission utilizing such a stock as a lubricant becomes costly because tolerances become critical and the seals must be very tight in order that there is no undue loss of the fluid through vaporization. Such highly volatile fluids, however, can be quite useful as lubricants when the transmission is properly designed so as to prevent fluid loss by vaporization and when the pressure-volume-temperature relationship within the transmission is such that a substantial portion of the fluid remains in liquid phase during the operation of the transmission.

Broadly, the oil should boil mainly above 500° F. and, preferably, mainly above 600° F. and (except in greases) have a 90% point below 950° F. Distillation of such stock is preferably conducted at reduced pressure, including vacuum-steam distillation, (as under 5 mm. Hg.) to avoid thermal decomposition.

Normally, our monomer-free perhydrogenated terphenyl and fluorene compounds will be produced from distillate fractions obtainable in a petroleum refinery, such as the recycle from catalytic cracking or the recycle from thermal demethylation of alkyl aromatic hydrocarbons. Satisfactory traction fluids can be compounded from such perhydrogenated distillate fractions, when the distill⋅te fraction contains at least 5% (preferably at least 15%) of terphenyl, fluorene, hydrofluorene, or hydroterphenyl compounds.

When the hydrocarbon base stock of our invention consists essentially of naphthenes corresponding to perhydrogenated terphenyl or fluorene or alkyl and cycloalkyl derivatives thereof, the base stock has a low viscosity index, and therefore, has poor low temperature properties, such as the pour point. We have discovered that novel traction fluids having a traction coefficient at least 10% greater than that of DMAP (at 600 ft./min., 200° F., 400,000 p.s.i.) and having an ASTM–VI greater than 40, can be prepared by blending from 1–20 parts by weight of fluid, branched paraffin hydrocarbons containing an average of over 3 branches per chain, with fluid $C_{18}$–$C_{40}$ naphthenes containing perhydroterphenyl or perhydrofluorene as a structural nucleus.

We have discovered, surprisingly, that a particularly useful power transmission system comprises a friction drive transmission and, as a lubricant therefor, a substantially saturated hydrocarbon base stock having a 260 UVA below 0.5 and comprising at least one member selected from the class consisting of perhydro-ortho terphenyl, $C_{18}$–$C_{40}$ hydrocarbon substituted derivatives of terphenyls, perhydrofluorene and the $C_{14}$–$C_{25}$ hydrocarbon substituted derivatives of perhydrofluorene, the perhydroterphenyl or perhydrofluorene compound being present in an amount of at least 5% by weight of the base stock, and wherein there is present from 0.1–20 parts by weight, based on said perhydrofluorene, of a fully hydrogenated, liquid $C_3$, $C_4$, $C_5$, $C_6$, $C_7$, or $C_8$ olefin polymer, copolymer, or terpolymer. Preferably said olefin comprises isobutylene, 3-methylbutene-1, 4-methylpentene-1, or 2,3-dimethylbutene-1. More preferably at least 35% (most preferably 90–100%) of the repeating units (exclusive of terminal methyl groups) of said olefin polymer have the structure

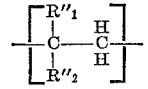

wherein $R''_1$ is hydrogen or methyl, and when $R''_1$ is hydrogen, $R''_2$ is isopropyl or isobutyl, and when $R''_1$ is methyl, $R''_2$ is methyl, ethyl, isopropyl, or isobutyl.

Ser. No. 679,851, (now U.S. 3,598,740 issued Aug. 10, 1971 discloses a power transmission system comprising a traction drive transmisison and, as a lubricant therefor, a hydrocarbon base stock having a kinematic viscosity at 210° F. in the range of 1.5–200.0 cs., said base stock comprising a paraffinic oil containing less than 1% by weight of aromatics having an ultraviolet absorptivity at 260 millimicrons of less than 0.5. Preferably, the paraffinic oil is obtained by severe hydrogenation of a petroleum oil having a percent $C_P$ greater than 60, a percent $C_N$ greater than 30, and a percent $C_A$ greater than 2. The paraffinic oil, preferably, has an ASTM–VI greater than 80, a refractive index at 68° F. greater than 1.47 and an SUS viscosity at 100° F. in the range of 60–3000.

In another embodiment, the base stock contains from 5–75% of a $C_{13}$–$C_{40}$ naphthene having a glass transition temperature in the range of −90 to −30° C. and containing, as a structural nucleus, a cyclohexyl hydrindan, di(cyclohexyl)-alkane, spirodecane, spiropentane, perhydrofluorene, perhydrobiphenyl, perhydroterphenyl, decalin, norbornane, perhydroindacene, perhydrohomotetraphthene, perhydroacenaphthene, perhydrophenanthrene, perhydrocrysene, perhydroindane - 1 - spirocyclohexane, perhydrocarylophyllene, pinane, camphane, perhydrophenylnaphthalene, perhydropyrene, or adamantane. Although the conventional paraffinic and naphthenic petroleum oils contain minor amounts of individual members of some or all of the above types of naphthene, it is very rare to encounter more than 5% of any individual class in a given petroleum lubricating oil. Therefore, a given paraffinic oil, of the type useful in our invention, should be analyzed to determine its content of some or all of the aforementioned classes of naphthene and, at least one member of at least one of the above classes of naphthene should be added to the paraffin oil in sufficient quantity to increase the traction coefficient thereof. Preferably the traction coeffiicent at 600 ft./min. 400,000 p.s.i., 200° F., should be increased at least 10% by means of such addition of naphthenes.

Another useful component of a blended traction fluid is a $C_{12}$–$C_{48}$ adamantane compound containing no elements other than carbon, hydrogen, fluorine and oxygen and wherein if oxygen is present, said oxygen is in a hydroxyl, ketone, or carboxylic acid radical or is combined in an ether or an ester linkage. Such compounds are generally known to the art or are described in the previously cited applications Ser. Nos. 679,801; 876,993; 003,-256; 056,680; 080,779; 091,183 and the applications of Driscoll and Haseltine, Jr., filed May 17, 1971 and June 11, 1971. A preferred base stock comprises such an adamantane compound and a partially or fully hydrogenated polyolefin oil (especially a polyvinylidene, such as polyisobutylene, having a high degree of gem substitution as in the previously cited applications Ser. Nos. 028,942; 052,300; 052,301; 052,771, 052,772; 052,773; 052,268 and the applications Driscoll and Haseltine, Jr.).

In general, the traction coefficient of any hydrocarbon oil, whether synthetic or a refined mineral oil, can be improved by addition thereto of an effective amount (typically 0.5–25 weight percent) of such an adamantane compound or of a polar compound of the type disclosed in the application of Driscoll and Haseltine, Jr., filed June 11, 1971.

Another preferred embodiment is a hydrocarbon base stock, useful as a traction fluid, comprising a mixture of substituted adamantanes derived by contacting a petroleum hydrocarbon stream which is substantially free from aromatic or olefinic unsaturation and which contains at least one perhydroaromatic hydrocarbon having three rings and at least 12 carbon atoms at a temperature in the range of —5 to +50° C. with an aluminum halide catalyst, and continuing such contact until at least a substantial proportion of the perhydroaromatic has been converted to hydrocarbon product having admantane structure. The adamantanes so produced can be further converted by alkylation, as by the method of the aforementioned Schneider patent application.

One such blended traction fluid comprises perhydrophenanthrene, and from 0.1–10 parts, based on the perhydrophenanthrene, of cyclopentyldimethyladamantane, and can also contain one or a mixture of members selected from a synthetic liquid paraffinic lube, any of which can be unhydrogenated, partially hydrogenated, or fully hydrogenated (including hydrocracked oils).

Due to the high cost of the adamantane compounds, it is only in highly specialized applications where economics will permit their use, per se, as traction fluids. However, due to their high coefficient of traction, compared with their viscosity index, the adamantanes are especially useful components for blending with other naphthenes, with branched paraffins, and with hydrogenated naphthenic or paraffinic petroleum oils in the compounding or traction fluids. Another adamantane compound which is useful as a traction fluid or as a component of a blended traction fluid, is obtained by perhydrogenation of benzyladamantal ether, which can be obtained by the method in *J. Org. Chem.*, Vol. 27, page 1933 (June 1964).

U.S. 3,595,796 contains many examples of naphthenes and branched paraffins useful in the present invention and examples of their use as components of blended traction fluids.

ILLUSTRATIVE EXAMPLE

A comparison of the maximum torque which can be obtained without slippage with four fluids in a traction transmission is shown in Table V below, along with the viscosity index and the coefficient of traction obtained in the laboratory test device at 500,000 p.s.i., 200° F., and 1000 ft./min. It can be seen that Oil 1, a naphthene-paraffin blend, possesses the best combination of traction properties and fluidity properties (e.g., the viscosity index). Oil 1 has only 9% greater coefficient of traction in the laboratory device than Oil 23, poly-mixed butenes and yet is able to withstand 32% greater torque without slippage than can Oil 23. Note also that Oil 5, containing about 20% of perhydrogenated α-methyl styrene trimers, has the best traction properties but has the lowest viscosity index of the four oils.

In general, naphthene-paraffin blends (such as oil #1 in Table IV) can be compounded from polymeric reaction products of at least one of the olefinic hydrocarbon monomers taken from the group consisting of ethylene, propene, butene, pentene, hexene, heptene and octene, including copolymers of two or more of such monomers, said polymeric reaction product being substantially free from olefinic unsaturation. The usual oils prepared from polyolefins and copolymers of polyolefins have considerable olefinic unsaturation, for example, one commercially available polybutene has an iodine number of 48. Preferably, oils prepared from such highly unsaturated polyolefins are hydrogenated to produce a hydrogenated polyolefin oil which is substantially free from olefinic unsaturation. Preferably, the oils have an iodine number less than 5, more preferably, less than 2. More preferred than the iodine number as a means of defining residual olefinic unsaturation in polymers which are substantially free from olefinic unsaturation is the ultraviolet absorption in the region of 190–195 millimicrons (herein sometimes referred to as 195 UCA). Preferred fluids are a hydrogenated polypropylene having a 195 UVA no greater than 2.0 (e.g., 1.88), even more preferred is a hydrogenated polybutene having a 195 UVA less than 1.0 (e.g., 0.77). Less preferred, but operable blended fluids can be prepared by blending one or more naphthene hydrocarbons with the polymeric reaction product of at least one of the olefinic monomers taken from the group consisting of propene, butene, and pentene, said polymer having a molecular weight of 300 to 500. Fluids comprised of such polymeric reaction products are useful in the combination of a friction drive machine comprising a power input member and a power output member in tractive rolling contact relationship, an oxidation-resistant fluid film between said members and said fluid. Similarly, such fluids comprised of such polymeric reaction products are useful in the combination of a toric transmission mechanism comprised of at least 2 axially aligned opposing power transmitting race members, each having a toric raceway in its opposing face and at least one roller member disposed between said race members in tractive rolling contact relationship with each of said raceways, a fluid film between said racers ad roller at the points of contact and said fluid. Examples are such a friction drive or such a toric transmission mechanism wherein said fluid is comprised of polybutene having a molecular weight of about 400, and preferably, wherein said polybutene is a hydrogenated polybutene.

Useful blended traction fluids similar to the naphthene-paraffin blend of Table IV can be prepared by blending at least 5 volume percent (more preferably, at least 15 volume percent) of the polymeric reaction product of at least one of the olefinic hydrocarbon monomers taken from the group consisting of ethylene, propene, butene, pentene, hexene, heptene and octene (most preferably, said polymeric reaction product having been hydrogenated so as to be substantially free from olefinic unsaturation) and as the naphthene component of a $C_{12}$–$C_{70}$ organic liquid having at least one saturated ring having a coefficient of traction of at least 0.06 as defined in French Pat. No. 1,541,833. The naphthene component can be a fused, saturated compound having from 2 to 0 fused rings and a total carbon atom content of from about 9 to about 60 as described in U.S. Pat. 3,411,369. As the paraffinic or non-naphthene component of a useful blended traction fluid is a hydrocarbon having an acyclic structure with at least three quarternary carbon atoms, as described in French Pat. No. 1,541,833. In general, blended traction fluids can be prepared wherein at least one component is selected from the group consisting of paraffins, hydrogenated paraffinic lube oil containing less than 1% gel aromatics, hydrogenated naphthenic lube oil containing less than 1% aromatics, and paraffin oils, (e.g., polymeric reaction product of at least one $C_2$–$C_8$ olefinic hydrocarbon monomer, wherein the polymeric reaction product is subtantially free from olefinic unsaturation) and as a second component at least one member selected from the group consisting of $C_{12}$–$C_{70}$ organic liquids having a coefficient of traction of at least 0.06, at least one saturated ring and wherein up to eight carbon atoms may be replaced with oxygen or phosphorous atoms, and fused, saturated compounds having from 2 to 9 fused rings and a total carbon atom content of from about 9 to about 60, up to eight of which atoms can be replaced by atoms selected from the group consisting of oxygen, nitrogen, phosphorous and silicone (e.g., see U.S. 3,411,369 and French Pat. 1,541,833). One useful liquid, having at least one saturated ring is 1,3-(5,7-dimethyl)adamantyl dipelargonate (DMAP).

In general, the choice of molecular weight of components of traction fluids is determined primarily by the desired viscosity characteristics of the fluid (taking into consideration the effect of any other components, such as low VI naphthenes or highly viscous VI improvers). The following are examples of the relationship between the average molecular weight of polyolefin oils and the viscosity at 210° F.

|  | KV 210° F. | Average mol. weight |
|---|---|---|
| Oil number from tables I and II: | | |
| 25 | 5.679 | 457 |
| 31 | 5.47 | 361 |
| 44 | 8.50 | 555 |

The traction coefficients given in Table II, U.S. 3,595,-796 were obtained by the test procedure and apparatus described by Rounds, F. G., *Journal of C&E Data*, 5, No. 4, pp. 499–507 (1960). In Table II, ASTM Oil No. 3 can be used as a reference point or standard for comparison with other test reports. It should be noted that these numbers in Table II are considerably lower in magnitude than the traction coefficients reported in the aforementioned U.S. Pats. 3,411,369 and 3,440,894 of William C. Hammann and Robert C. Schisla. In order to provide common basis for comparing the present data with that of said patents, the following traction coefficients are presented, as measured by the Rounds method:

|  | Hammond et al. | Method of Rounds | | | |
|---|---|---|---|---|---|
|  | 400,000 p.s.i. | 400,000 p.s.i. | | | 500,000 p.s.i. |
| Ft./min | 750 | 600 | 750 | 1,000 | 1,000 |
| Perhydro-o-terphenyl (Oil B) | .073 | .065 | .063 | .062 | .050 |
| Cosden polybutene (Oil 23) | .060 | .050 | .047 | .045 | .044 |
| ASTM Oil 3 (Oil 35) | | .042 | .039 | .037 | .042 |
| Bis (2,4,6 trimethyl cyclohexyl) methane | .061 | .045 | .042 | .040 | .042 |
| Perhydro-styrene dimerizate (Oil 15) | | .049 | .049 | .049 | .052 |
| TIPD (Oil 17) | | .052 | .050 | .048 | .044 |
| Perhydro-polybutene (Oil 19) | | .053 | .050 | .047 | .042 |
| Perhydro-alpha-methyl styrene dimerizate (Oil 6) | .074 | .055 | .054 | .053 | .045 |

NOTE.—All measurements at 200° F.

Due to day-to-day test variations, all measurements are normalized, by comparison with a standard (here Oil 23) as by means of the following equation for 600 ft./min., 400,000 p.s.i. and 200° F.

$$\frac{\text{Oil 23 measured coefficient}}{0.045} = \frac{\text{Sample measurement coefficient}}{\text{Normalized coefficient}}$$

the bis (2,4,6 trimethyl cyclohexyl) methane has a $KV_{210}$ of 2.94 cs. and $KV_{100}$ of 19.61, $$d\frac{20}{4}0.8886,$$

and a VTF–VI of 104. In making traction coefficient measurements by the Rounds method, the measurement is frequently made, at a number of different velocities (from 0 to 750 ft./min.) and a curve is drawn from which data at other velocities can be taken (by extrapolation). The properties of ASTM Oil No. 3 (which is sold under the trade name "Circolite") are reported in greater detail in Tables I and II of U.S. 3,595,796 (see Oil 35).

In the present invention the preferred acyclic tractants are substantially saturated (e.g., they have a bromine number less than 5, more preferably less than 1). However, the acyclic synthetic liquid $C_3$–$C_8$ olefinic homopolymers, copolymers or terpolymers described herein can also be useful per se as tractants or as components of tractant blends.

The oxidation stability of these olefinic acyclic polymers is improved by hydrogenation, either partially (as to a bromine number in the range of 5–30) or by substantially complete saturation (e.g., perhydrogenation to produce a synthetic acyclic paraffin).

Table II of U.S. 3,595,796 reports the Tag acid number (TAN) and percent increase in kinematic viscosity at 100° F. ($KV_{100}$) of the "used oil," that is, the oil after testing for traction coefficient. Similarly, after extended use in a transmission, the increase in acid number and viscosity (caused by oxidation) can be such that the traction fluid, consisting of the base oil and lubricant additives, must be replaced. Such a "used" or "oxidized" fluid can be reclaimed or "revitalized" by contacting with an adsorbent, as by passing the oil through a column containing silica gel and activated charcoal (which can be admixed or in separate layers). Other adsorbents (e.g., fuller's earth or acid-activated clay, alumina, spent alumino-silicate catalyst, etc.) or adsorbent admixtures can be used. Treatment with a Lewis acid (e.g., HF, $H_2SO_4$) preferably followed by washing, can be used instead of, or in combination with the adsorbent contacting. Such treatment will reduce or remove polar lubricant additives; therefore, the reclaimed oil can be replenished with such additives prior to reuse.

The following Table V lists many examples of hydrocarbon base stocks which have traction properties at least as good as ASTM Oil No. 3 (i.e., "Circolite") and also lists lubricants comprising such base additives. In the tables run numbers are frequently given to show where the usual run-to-run differences encountered in chemical synthesis may occur.

The following is a key to abbreviations used in the table:

"4-Ball" is the torque measurement of the fluid at room temperature using a Roxana tester or a Shell tester modified to measure torque.

"Prototype" is the traction coefficient determined in an actual automotive transmission, similar to that of FIGS. 1 and 2.

"Rounds Average" and "Rounds 500,000 p.s.i." are traction coefficient by the method of Rounds, *Journal of C&E Data*, 5, # 4, pp. 499–507 (1960).

"Tg ° C." is the glass transition temperature.

"PAMVCH" is substantially completely hydrogenated polyalphamethyl styrene, primarily in hydrindan form and mostly the dimer, except where otherwise indicated (e.g., "trimer").

"Oronite" is a tradename for commercially available polybutene, the indicated fluids can be distillate fractions (as indicated by their viscosity) of such fluids.

"Hyd." indicates the material was substantially fully hydrogenated (Bromine number 5 or less), unless otherwise indicated (e.g., "partially").

"Polyvis" is a tradename for a commercially available polybutene oil, the samples are usually distillates of this oil or of the oil after hydrogenation.

"PIB" indicates a thermally cracked and hydrogenated polyisobutylene oil of gem-dimethyl configuration and containing the repeating units . . . $C_{19}$, $C_{20}$, $C_{23}$, $C_{24}$, $C_{27}$, $C_{28}$ . . . etc. (see *J. Poly. Sci.* part A–1, vol. 9, 717–745 (1971).

"PVCH" is hydrogenated polystyrene, mainly dimers.

"PAMS" is polyalphamethyl styrene, mostly indan dimer (known in the trade as "saturated" dimer) with some trimer.

"Indopol" is a commercially available polybutene oil.

"DMA" is dimethyl adamantane.

"Formolite" is an oil product from the acid-catalyzed reaction of formaldehyde (see Oil 53 of Table I for one such preparation).

"Circolite" is a tradename for ASTM Oil No. 3, see further *ASTM Standards 1964*, part 28, pages 289–290 (Method D–471–63T).

"New 98 Golden" and "New 91 Golden" are severely hydrorefined naphthenic distillates (see Ser. No. 812,516 and 850,717).

"Sunvis 11" is a commercially available solvent refined paraffinic lube.

TABLE IV

| Oil number | ASTM-VI | Laboratory traction coefficient | Maximum torque without slippage, ft.-lbs. |
|---|---|---|---|
| 35 (Naphthenic lube) | −11 | 0.042 | 90 |
| ASTM—oil No. 3 | | | |
| 23 (Poly-mixed butenes) | 53 | 0.044 | 103 |
| 1 (Naphthene-paraffin blend) | 62 | 0.0485 | 136 |
| 5 (Hydrogenated α-methyl styrene dimer) | −46 | 0.049 | 144 |

The performance of Oil 1 in the traction transmission is satisfactory for automotive use. However, the properties of Oil A in Table III of U.S. 3,595,796 indicate that it will allow the traction transmission to operate at an even higher torque without slippage than any of the four oils on this Table. Oil A is a blend of 70% hydrogenated cracked polyisobutylene (average molecular weight 409, Tg −112° C.) and 30% hydrindan trimer of alpha methyl styrene.

TABLE V—Continued

| | Fluid | 4-ball | Proto-type | Rounds, average | Rounds, 500,000 p.s.i. | KV₂₁₀ | KV₁₀₀ | VTF VI | ASTM VI | Brookfield 0° F. | Brookfield −20° F. | Mol. wt. | T_z, °C. | Density | Pour point, °F. |
|---|---|---|---|---|---|---|---|---|---|---|---|---|---|---|---|
| 27 | do | | | | | 4.37 | 27.90 | 59 | 50 | | | | | | −40 |
| 28 | do | | | | | 4.52 | 29.09 | 63 | 57 | | | | | | |
| 29 | do | | | | | 4.54 | 29.55 | 61 | 55 | | | | | | −50 |
| 30 | do | .0809 | | | | 4.63 | 30.68 | 60 | 55 | | | | | | −60 |
| 31 | do | .810 | | .0414 | .042 | 5.20 | 35.99 | 69 | 74 | | | | −93 | .8238 | |
| 32 | Indopol, hyd | .0807 | | | | 3.27 | 16.01 | 65 | 68 | | | | | | |
| 33 | do | | | | | 3.83 | 20.81 | 77 | 71 | | | | | | |
| 34 | Oronite, partially hyd | .0819 | | | | 3.20 | 15.00 | 77 | 79 | | | | | | −60 |
| 35 | Oronite, hyd | .0821 | | .0428 | .048 | 2.84 | 12.34 | 86 | 78 | | | | −110 | | |
| 36 | do | .825 | | | | 3.15 | 14.70 | 86 | 82 | | | | | | |
| 37 | do | .0823 | | | | 3.17 | 15.27 | 84 | 67 | 410 | | | | | |
| 38 | do | .0824 | | | | 3.19 | 14.93 | 76 | 79 | | | | | | |
| 39 | do | | | | | 3.28 | 15.73 | 86 | 77 | 460 | | | | | |
| 40 | PIB, hyd | .0850 | .0415 | .0462 | .052 | 1.52 | 4.49 | 84 | 137 | | | | | | −45 |
| 41 | PIB, hyd | | | | | 3.22 | 13.49 | 114 | 116 | 160 | | | | | |
| 42 | PIB, hyd | | | | | 3.84 | 18.22 | 108 | 113 | | | | | | |
| 43 | PIB, hyd | | | | | 4.35 | 22.51 | 105 | 111 | | | | | | |
| 44 | PIB, hyd | .0858 | | | | 4.92 | 28.02 | 100 | 110 | | 560 | | | .8393 | |
| 45 | PIB, hyd | | | | | 5.91 | 37.92 | 98 | 109 | KV₀ 1742 | | | | | |
| 46 | PIB, hyd | .0881 | | .0362 | .043 | 6.12 | 62.66 | 98 | | | | | −112 | .8505 | −60 |
| 47 | PIB, hyd | | | | | 8.70 | 69.40 | 99 | 107 | | | | | | |
| 48 | Well characterized compounds—Octacosane | | | | | 3.75 | (15.1) | 134 | 156 | | | | | | −15 |
| 49 | Ethylene/propylene, 55/44 | | | .0266 | .020 | 8.60 | 51.5 | 130 | 136 | | | 555 | −96 | .8245 | −15 |
| 50 | Polypropylene | | | .0272 | .026 | 6.49 | 28.77 | 80 | 80 | | | | −79 | .8107 | −30 |
| 51 | do | | | .0310 | .033 | 5.68 | 43.53 | 80 | 67 | | | | −67 | .8159 | −25 |
| 52 | do | | | .0320 | .036 | 9.27 | 98.14 | 64 | | | | | −64 | .8233 | −25 |
| 53 | Propylene/1-butene, 51/49 | .0737 | | .0284 | .037 | 6.18 | 46.89 | 74 | 82 | | | 466 | −83 | .8191 | −35 |
| 54 | Poly(1-butene) | | | .0368 | .039 | 7.29 | 66.48 | 60 | 69 | | | | −84 | .8325 | |
| 55 | do | | | .0272 | .036 | 10.38 | 117.62 | 65 | 71 | | | 557 | −82 | .8329 | |
| 56 | Poly(1-pentene) | .0706 | | | | 3.67 | 18.14 | 93 | | | | | | | |
| 57 | Poly(1-hexene) | .0684 | | .0284 | .033 | 7.40 | 52.82 | 102 | 110 | 348 | | 465 | −93 | .8230 | −70 |
| 58 | Poly(1-octene) | .0641 | .015 | .0234 | .029 | 3.95 | 18.89 | 109 | 115 | | | 465 | −106 | | −80 |
| 59 | Poly 1,3(3-methylbutene-1) | .0788 | | .0388 | .046 | 5.47 | 18.92 | 107 | 117 | | | 361 | −87 | | −65 |
| 60 | Poly(4-methylpentene-1) | .0783 | | .0422 | .041 | 4.80 | 46.71 | 28 | 31 | | | 433 | −86 | .8139 | −25 |
| 61 | Poly(2,3-dimethylbutene-1) | | | | | 7.48 | 90.76 | −1 | 12 | | | | | | −50 |
| 62 | Poly(2,3-dimethylbutene-1) | .0895 | | .0462 | .053 | 7.98 | 115.98 | −30 | 0 | | | | −74 | .8393 | +10 |
| 63 | Tetraisopropyldecalin-Hyd | | | | | 6.44 | 197.4 | −584 | 0 | | | | | | |
| 64 | do | .0861 | | .0410 | .044 | 6.44 | 191 | −552 | 0 | | | | | | |
| 65 | do | | | | | 6.54 | 198.8 | −555 | 0 | | | | −48 | | +10 |
| 66 | do | | | | | 7.18 | 261.15 | −602 | 0 | | | | | | +10 |
| 67 | Hyd. o-terphenyl | .0913 | .060 | .0524 | .050 | 4.18 | 40.48 | −113 | | | | 240 | −59 | | −5 |
| 68 | do | | | | | 4.25 | 42.79 | −125 | 0 | | | | | | |
| 69 | Hyd. p-terphenyl | | | | | Solid | Solid | | 10 | | | | | | −26 |
| 70 | Dimethyladamantane | | | | | 1.16 | 2.89 | 67 | | | | 204 | −40 | | |
| 71 | DMA dimer | .0712 | | | | 27.44 | 2,270 | −169 | 0 | | | | | | −52 |
| 72 | Ethyladamantane | .0933 | | | | 1.55 | 4.42 | 111 | | | | 224 | −87 | | −70 |
| 73 | DMA dipelargonate | .0730 | | | | 7.45 | 54.14 | 86 | 0 | | | | −86 | | |
| 74 | DMA dicaprolate | .0864 | | .0388 | .041 | 4.73 | 34.59 | 39 | 0 | KV₋₄₀ 44,490 | | | −119 | .9729 | |
| 75 | Cyclopentyl DMA | .0802 | | | | 1.72 | 5.24 | 107 | | | | | −101 | | 0 |
| 76 | Perhydrophenanthrone | .0772 | | | | 1.73 | 4.96 | 134 | 0 | | | | −54 | | |
| 77 | Hyd, 9-benzylidene fluorene | .0816 | | | | 5.56 | 83.94 | −189 | 0 | | | | | | |
| 78 | Di-2-ethylhexylsebacate | .0639 | | | | | | | | | | | | | |
| 79 | Di-indene | .0841 | | | | 4.46 | 82.38 | 28 | 10 | | | | | | |
| 80 | Poorly characterized fluids—Monsanto HB-40 | .0738 | | | | 3.82 | 30.39 | −57 | 0 | | | | | | −5 |
| 81 | Amoco BM-1 | .0743 | | | | 4.26 | 51.72 | −243 | 0 | | | | | | −30 |
| 82 | Hyd. Amoco BM-1 | .0819 | | | | 3.73 | 33.46 | −137 | 0 | | | | | | −30 |
| 83 | Hyd. formolite | | | .0392 | .045 | 6.27 | 77.29 | −47 | 0 | | | 275 | −58 | | +85 |
| 84 | Dixylyl methane, hyd | .0819 | | | | 1.99 | 7.55 | 39 | 0 | | | | | | +50 |
| 85 | Tritotyl dimethane, hyd | .0909 | | | | 8.09 | 162.0 | −133 | 0 | | | | | | +20 |
| 86 | Ditetralyl methane, hyd | .0903 | | | | 10.75 | 272.5 | −122 | 0 | | | | | | |
| 87 | Trixylyl dimethane, hyd | .0845 | | | | 10.03 | 340.0 | −257 | 0 | | | | | | +30 |
| 88 | 4-ring formolite, hyd | | | | | 30.70 | 6,900 | −484 | 0 | | | | | | |
| 89 | Hyd. transil stock | | | .0416 | .044 | 2.24 | 8.88 | 61 | 55 | | | | −100 | | −30 |
| 90 | Circolite | | | .0340 | .042 | 4.41 | 33.43 | 12 | 0 | | | 304 | −77 | | −30 |
| 91 | do | .0768 | | | | 4.42 | 33.43 | 13 | | | | | | | |

| | | | | | | | | | | | |
|---|---|---|---|---|---|---|---|---|---|---|---|
| 93 | Hyd. circolite | | | 4.66 | 34.31 | 34 | 22 | | | 371 | −79 | −35 |
| 94 | New 98 golden | | .0372 | 4.64 | 35.92 | 18 | 3 | | | 324 | −81 | −25 |
| 95 | Hyd. new 98 golden | | .0298 | 4.56 | 32.39 | 27 | 27 | | | 330 | −84 | −40 |
| 96 | Hyd. new 98 golden | | .0392 | 4.31 | 29.16 | 41 | 24 | | | | −84 | −55 |
| 97 | Hyd. new 91 golden | | .0416 | 3.55 | 20.47 | 46 | 0 | | | | | −45 |
| 98 | Hyd. 3-G extract | | | 5.13 | 55.89 | −72 | | | | 308 | −63.5 | −10 |
| 99 | SunVis 11 | .0717 | .0348 | 4.38 | 23.61 | 98 | | | | | | |
| 100 | do | .0719 | | 3.99 | 20.51 | 98 | | | | | | |
| 101 | Hyd. SunVis 11 | | .038 | 4.24 | 22.35 | 96 | | | | | | |
| 102 | Hyd. resin picolyte S-10 | .0768 | | 6.93 | 69.90 | 32 | 103 | | | | | −15 |
| 103 | Hyd. Picovar AP10 | .0822 | | 3.27 | 20.53 | −12 | 40 | | | | | |
| 104 | Coal tar distillate | .0787 | | 4.50 | 67.99 | −367 | 0 | | | | | |
| 105 | Coal tar distillate, hyd | .0818 | | 4.01 | 42.93 | −202 | 0 | | | | | −30 |
| 106 | Syn. lube care lab 321 | .0645 | | 3.51 | 13.60 | 136 | 157 | | | | | |
| 107 | PAMVCH/polyisobutylene, hyd.— | | | | | | | | | | | |
| 108 | 30/70, 506566/506649-10 | .0869 | .043 | 4.39 | 29.60 | 46 | 31 | | | | −89 | −20 |
| 109 | 50/50, 485564/485555-1 | .0857 | .0472 | 6.69 | 59.1 | 55 | 62 | | | | −93 | −35 |
| 110 | 50/50, 506581/532570-10 | .0786 | | 6.35 | 26.16 | 73 | 69 | 2130 | | | | |
| 8 | 50/50, 506566/532645-1 | .0882 | | 3.72 | 19.91 | 76 | 69 | 1110 | | | | |
| 111 | PAMVCH | .0886 | .0622 | 4.49 | 37.37 | −15 | 0 | | | | −68 | −5 |
| 112 | 95/5, 506566/532570-10 | .0895 | | 4.54 | 35.08 | 13 | 0 | | | | | |
| 113 | 90/10, 506566/532570-10 | .0895 | | 4.56 | 33.41 | 31 | 15 | | | | | .9318 |
| 114 | 80/20, 506566/532570-10 | .0897 | | 4.58 | 31.88 | 46 | 35 | | | | | .9180 −35 |
| 115 | 70/30, 506566/532570-10 | .0899 | | 4.61 | 30.74 | 58 | 52 | | | | | .9119 |
| 116 | 60/40, 506566/532570-10 | .0900 | | 4.63 | 29.60 | 69 | 66 | | | | | .9082 |
| 117 | 50/50, 506566/532570-10 | .0898 | | 4.67 | 29.30 | 74 | 74 | | | | | .8903 −40 |
| 118 | 40/60, 506566/532570-10 | .0893 | | 4.75 | 28.40 | 87 | 92 | | | | | .8876 |
| 119 | 30/70, 506566/532570-10 | .0885 | | 4.79 | 28.05 | 92 | 99 | | | | | .8696 −40 |
| 120 | 20/80, 506566/532570-10 | .0870 | | 4.87 | 27.88 | 98 | 106 | | | | | .8611 |
| 44 | 10/90 506560/532570-10 | .0858 | | 4.92 | 28.02 | 100 | 110 | | | | | .8527 −45 |
| | PIB | | | | | | | | | | | .8893 |
| 121 | PAMVCH trimer/polyisobutylene— | | | | | | | | | | | |
| 122 | 30/70, 506567-10/532538-10 | .0916 | .0530 | 8.57 | 89.36 | 57 | 66 | | | (?) | −105 | −30 |
| | 70/70, 106592/506649-10 | .0894 | | 7.60 | 76.7 | 47 | | | | (?) | −81 | −25 |
| | PAMVCH/polyvis-OSH 50/50, 485658/475766 | | .0438 | 4.40 | 30.02 | 43 | 28 | 5,650 | 45,362 | 339 | | −50 |
| | PAMVCH/polyvis, hyd.— | | | | | | | | | | | |
| 124 | 10/90, 506536/506563 | .0807 | .0448 | 4.29 | 27.02 | 60 | 49 | 3,872 | | | −95 | .8346 −30 |
| 125 | 30/70, 506520/506509-2 | | .0493 | 4.50 | 30.28 | 51 | 41 | 6,309 | | | −88.5 | .8582 −30 |
| 126 | 50/50, 506566/506509-1 | | .055 | 4.55 | 32.10 | 41 | 28 | 4,813 | 34,150 | 283 | −83 | .8819 −20 |
| 127 | 50/50, 506566/532563 | .0859 | | 4.27 | 28.60 | 42 | 24 | 5,160 | 46,500 | | −87 | .8822 −25 |
| 128 | 50/50, 506566/532610 | .0860 | .0530 | 4.45 | 30.93 | 40 | 28 | | | | | |
| 129 | 50/50 (Cleaned up 714-35) | .0854 | .0515 | 4.49 | 37.37 | −15 | 25 | | | 251 | −68 | −5 |
| | PAMVCH | .0854 | | 4.41 | 29.90 | 45 | 31 | | | | | |
| 130 | 50/50, 506581/532501-1 | | | 4.54 | 29.55 | 61 | 55 | | | | | |
| 8 | 50/50, 506566/532622 | .0882 | | 4.49 | 37.37 | −15 | 0 | | | 251 | −68 | −5 |
| 29 | Polyvis, hyd | .0909 | | 4.37 | 30.93 | −10 | 4 | | | | −72 | .9249 |
| 131 | PAMVCH | .0807 | .0615 | 3.47 | 37.37 | 26 | 24 | 4,813 | | 283 | −78 | .9104 |
| 132 | 90/10, 506566/506563 | .0861 | | 4.05 | 34.37 | 42 | 31 | | | | −87 | .8822 −25 |
| 133 | 50/50, 506566/506563 | .0859 | | 4.49 | 31.37 | 57 | 49 | | | | −93 | .8514 |
| 134 | 25/75, 506566/506563 | .0807 | .044 | 4.36 | 28.60 | 60 | 49 | | | | −97 | .8362 |
| 135 | 10/90, 506566/506563 | .0781 | | 4.29 | 27.16 | 63 | 49 | | | | −95 | .8219 |
| 26 | Polyvis, hyd | .0867 | .0515 | 4.28 | 27.02 | 60 | 49 | | | | | |
| | PAMVCH/indopcl, hyd.— | | | | | | | | | | | |
| 136 | 45/55, 506581/506626-1 | .0857 | | 3.47 | 18.99 | 57 | 42 | 1,433 | 8,875 | 26,319 | −90 | −85 |
| 137 | 50/50, 506566/506626-1 | .0869 | | 4.05 | 25.35 | 50 | 33 | 3,160 | 1,8000 | 100,000 | −68 | −35 |
| 8 | PAMVCH | .0864 | | 3.75 | 22.04 | −15 | 35 | | | (251) | −68 | −5 |
| 32 | 50/50, 506566/506626-1 | .0807 | | 3.27 | 16.01 | 77 | 68 | | | | | |
| 138 | Indopol, hyd | | | | | | | | | | | |
| | PAMVCH/oronite, hyd.— | | | | | | | | | | | |
| 139 | 50/50, 506566/532624 | .0877 | | 3.69 | 21.55 | 50 | 33 | 2,160 | 5,710 | 85,000 | | .8346 −45 |
| 140 | 46/54, 532646-4/532680-1 | .0857 | | 3.62 | 20.25 | 59 | 45 | 1,710 | 9,700 | 100,000 | | −45 |
| 141 | 50/50, 506544/532680-1 | .0869 | | 3.82 | 22.91 | 50 | 35 | 2,460 | 15,000 | 100,000 | | −45 |
| 142 | 61/39, 506544/532680-1 | .0881 | .0525 | 4.04 | 26.07 | 41 | 20 | 4,010 | 33,000 | | | |
| 143 | 60/40, 544510/532680-1 | .0877 | .0545 | 4.65 | 35.70 | 21 | 7 | 8,460 | 79,500 | | | −15 |
| 144 | 75/25, 544510-1/532680-1 | .0580 | .0560 | 5.26 | 48.84 | −10 | 0 | 30,250 | 100,000 | | | |
| 145 | Polyvis, hyd | .0861 | | | | | | | | | | |
| 8 | 50/50, 32670-3/532680 | .0882 | | 4.49 | 37.37 | −15 | 0 | | | 251 | −68 | −5 |
| 36 | PAMVCH/indopcl, hyd | .0874 | | 3.55 | 19.67 | 58 | 43 | | | | | |
| 5 | Oronite | .0821 | | 2.84 | 12.34 | 86 | 78 | | | | −110 | |
| 147 | PAMVCH (3.81) | .0872 | | 3.57 | 25.4 | 15 | | 15,200 | | | | .9328 −10 |
| 148 | 75/25, 532670-3/532677 | .0867 | | 3.57 | | | | 3,500 | | | | −25 |
| | 50/50, 532670-3/532677 | .0858 | | 3.40 | | | | 1,260 | | | | −50 |

TABLE V—Continued

| | Fluid | 4-ball | Proto-type | Rounds, average | Rounds, 500,000 p.s.i. | KV$_{210}$ | KV$_{100}$ | VTF VI | ASTM VI | Brookfield 0° F. | Brookfield −20° F. | Mol. wt. | T$_g$, °C. | Density | Pour point, °F. |
|---|---|---|---|---|---|---|---|---|---|---|---|---|---|---|---|
| 149 | 25/75, 532670-3/532677 | .0844 | | | | 3.26 | | | | 660 | | | | | −60 |
| 36 | Oronite | .0825 | | | | 3.15 | 14.70 | 84 | 82 | 410 | | | | .8240 | −75 |
| 9 | PAMVCH (450) | .0894 | | | | 4.50 | 37.4 | −14 | 0 | 49,250 | | | | .9393 | −10 |
| 150 | 75/25, 532646-4/532677 | .0875 | | | | 4.04 | | | | 7,260 | | | | | |
| 151 | 50/50, 532646-4/532677 | .0862 | | | | 3.67 | | | | 1,960 | | | | | |
| 152 | 25/75, 532646-4/532677 | .0846 | | | | 3.39 | | | | 810 | | | | | |
| 36 | Oronite | .0825 | | | | 3.15 | 14.70 | 84 | 82 | 410 | | | | .8240 | −75 |
| 11 | PAMVCH (508) | .0889 | | | | 5.08 | 49.3 | −31 | 0 | 100,000 | | | | .9416 | −10 |
| 153 | 75/25, 500544/532677 | .0880 | | | | 4.40 | | | | 11,400 | | | | | |
| 154 | 50/50, 500544/532677 | .0851 | | | | 3.87 | | | | 2,500 | | | | | |
| 155 | 25/75, 500544/532677 | .0870 | | | | 3.47 | | | | 1,110 | | | | | |
| 36 | Oronite | .0825 | | | | 3.15 | 14.70 | 84 | 82 | 410 | | | | | |
| 13 | PAMVCH | .0803 | | | | 6.82 | 101.97 | −87 | 0 | | | | | | |
| 156 | 75/25, 544510-1/532680-1 | | | | | 5.43 | 52.34 | −9 | 19 | 40,250 | | | | | |
| 157 | 50/50, 544510-1/532680-1 | | | | | 4.43 | 31.21 | 35 | 52 | 4,960 | | | | | |
| 158 | 25/74, 544510-1/532680-1 | | | | | 3.75 | 21.12 | 64 | 52 | 1,360 | | | | | |
| 38 | Oronite | | | | | 3.19 | 14.93 | 86 | 79 | | | | | | |
| 159 | PAMVCH/oronite, partially hyd. | .0823 | | | | | | | | | | | | | |
| | 50/50, 532670-3/532080-2 | .0864 | | | | | | | | | | | | | |
| | Hyd, polystyrene/polyisobutylene— | | | | | | | | | | | | | | |
| 160 | 170 PVCH | | .0390 | | .047 | 4.38 | 28.88 | 52 | 40 | | | 281 | −85 | .8907 | −30 |
| | 30 PIB | | | | | | | | | | | | | | |
| 161 | 50 PVCH | | .0400 | | .048 | 5.27 | 40.25 | 49 | 52 | | | 310 | −94 | .8793 | −30 |
| | 50 PIB | | | | | | | | | | | | | | |
| 162 | 30 PVCH | | .0412 | | .048 | 5.17 | 37.48 | 58 | 61 | | | 323 | −102 | .8632 | −30 |
| | 70 PIB | | | | | | | | | | | | | | |
| 163 | 50 PVCH, 483687-1 | .0839 | | | | 1.95 | 6.67 | 87 | | KV−65 9,860 | | | | | |
| | 70 PIB, 544525-2 | | | | | | | | | | | | | | |
| | Polyisobutylene/polyvis, hyd.— | | | | | | | | | | | | | | |
| 164 | 50, 506649-10 | | .046 | | .046 | 4.32 | 24.59 | 84 | 84 | | | | −112 | | −25 |
| | 50, 506679-10 | | | | | | | | | | | | | | |
| 165 | 50, 506679-10 | | .0436 | | .050 | 4.09 | 22.31 | 86 | 86 | | | | | | −30 |
| | 50, 532558-10 | | | | | | | | | | | | | | |
| 166 | 50, 532645-1 | .0440 | | | | 3.83 | 19.73 | 90 | 90 | 660 | 2,060 | (4) | | | −1 |
| | 50, 532610 | | | | | | | | | | | | | | |
| | Polyvis. | | | | | | | | | | | | | | |
| 44 | PIB | .0858 | | | | | | | | | | | | | |
| 167 | 90/10, 532570-10/532610 | .0862 | | | | | | | | | | | | | |
| 168 | 80/20, 532570-10/532610 | .0857 | | | | | | | | | | | | | |
| 169 | 70/30, 532570-10/532610 | .0845 | | | | | | | | | | | | | |
| 170 | 60/40, 532570-10/532610 | .0842 | | | | | | | | | | | | | |
| 171 | 50/50, 532570-10/532610 | .0835 | | | | | | | | | | | | | |
| 172 | 40/60, 532570-10/532610 | .0828 | | | | | | | | | | | | | |
| 173 | 30/70, 532570-10/532610 | .0817 | | | | | | | | | | | | | |
| 174 | 20/80, 532570-10/532610 | .0813 | | | | | | | | | | | | | |
| 175 | 10/90, 532570-10/532610 | .0810 | | | | | | | | | | | | | |
| 30 | Polyvis. | | | | | | | | | | | | | | |
| | Polyisobutylene/polybutene— | | | | | | | | | | | | | | |
| 176 | 50 PIB, 532570-10 | .0842 | | | | | | | | | | | | | |
| | 50 IndoPol, 50662R-1 | | | | | | | | | | | | | | |
| 177 | 50 PIB, 532570-10 | .0827 | | | | | | | | | | | | | |
| | 50 oronite 506515 | | | | | | | | | | | | | | |
| | Miscellaneous blends— | | | | | | | | | | | | | | |
| | Cyclohexyl DMA | | | | | | | | | | | | | | |
| 178 | 67/33, 532655-2/544516 | .0841 | | | | 3.03 | 16.46 | 22 | 5 | | | | | | |
| 179 | 40/60, 532655-2/544516 | .0836 | | | | (3.28) | 16.28 | (74) | 64 | | | | | | |
| 39 | Oronite | .0824 | | | | 3.28 | 15.93 | 62 | 48 | | | | | | |
| 17 | PAMVCH trimer | | | | | 3.28 | 15.73 | 84 | 77 | | | | | | |
| 180 | 67/33, 506592/544516 | .0893 | | | | 19.55 | 1,312 | −221 | 0 | | | | | | |
| 181 | 40/60, 506592/544516 | .0876 | | | | 7.40 | 93.67 | −11 | 2 | | | | | | |
| 39 | Oronite | .0824 | | | | 3.28 | 15.73 | 84 | 77 | | | | | | |
| 72 | DMA dimer | .933 | | | | 27.44 | 269.3 | −54 | 0 | | | | | | |
| 182 | 75/25, 41568-1/544516 | .0918 | | | | 11.84 | 2,270 | −169 | 0 | | | | | −40 | |
| 183 | 49/51, 41568-1/544516 | .0897 | | | | 6.67 | 69.47 | 17 | 24 | 18,026 KV$_0$ | | | | | |
| 184 | 30/70, 41568-1/532680-1 | .0874 | | | | 5.06 | 38.50 | 42 | | 4,852 KV$_0$ | | | | | |
| 39 | Oronite | .0824 | | | | 3.28 | 15.73 | 84 | 77 | | | | | | |
| 185 | 40 PVCH | | | | .039 | 4.24 | 29.15 | 33 | 12 | | | 367 | −80 | | |
| | 60 Polypropylene | | | | | | | | | | | | | | |

| | Composition | | | | | | | | |
|---|---|---|---|---|---|---|---|---|---|
| 186 | (5 PAMS, 506580-6 / 95 PAMVCH, 506566 | | .0480 | .050 | 4.28 | 33.89 | −12 | 0 | | −70 | −10 |
| 187 | (75 PAMS, 532572-1 / 25 PAMVCH, 506566 | .0877 | | | 4.50 | 37.26 | −13 | 0 | | | |
| 188 | (5 PAMS, 532572-1 / 95 PAMVCH, 506566 | .0848 | | | 4.53 | 36.72 | −3 | 0 | | | |
| 189 | (10 PAMS, 532572-1 / 90 PAMVCH | .0830 | | | 4.45 | 36.68 | −14 | 0 | | | |
| 190 | (60 PAMS, 532572-1 / 40 PAMVCH, 506566 | .0778 | | | | | | | | | |
| 191 | (70 Formolite 4f, 5325yy-2 / 30 PIB, 532570-10 | .0883 | | | 7.45 | 69.05 | 60 | 69 | | | |
| 192 | (50 PIB, 506518 / 50 Hyd. new 98G, 506510-3 | | .0466 | .054 | 4.95 | 32.56 | 73 | 76 | | −104 | −45 |
| 193 | (50 Hyd. new 98G, 4885590 / 50 Polyvis hyd, 506563 | | .0406 | .043 | 4.32 | 28.33 | 50 | 36 | | −90 | −30 |
| 194 | (15 PAMVCH, 485594 / 85 Polyvis hyd., 485502 | | .0398 | .043 | 4.32 | 30.16 | 32 | 12 | 313 | −84 | −25 |
| 195 | (50 PAMVCH, 506566 / 50 New 98G, Nyd., 485590 | | .0422 | .046 | 4.38 | 31.93 | 23 | 1 | | −76 | |
| 196 | (50 PAMVCH, 506581 / 50 Hyd. sunvisill, 506611-3 | .0826 | .042 | .044 | 3.97 | 22.46 | 73 | 66 | | −89 | 50 |
| 197 | (50 PAMVCH, 506581 / 50 Hyd. transil, 506582 | | .0444 | .047 | 2.87 | 14.17 | 44 | 31 | | −85 | |
| 198 | (50 18-H, 506623-1 / 50 PAMVCH, 506566 | 0775 | .040 | .040 | 3.90 | 20.88 | 8.4 | 81 | 848 3,223 17,595 | −97 | |
| 199 | (50 18-H, 506623-1 / 50 Polyvis, 506627-10 | .0736 | .035 | .034 | 3.97 | 20.74 | 92 | 93. | 615.8 1,873 7,335 | −107 | |
| 200 | (25 18-H, 506623-1 / 75 PIB, 506649-1 | .0798 | | | 4.08 | 20.26 | 105 | 111 | | −122 | |
| 201 | (50 Poly(2,3DMB-1), 506681 / 50 PIB, 506649-1 | .0871 | .0460 | .048 | 5.55 | 39.95 | 70 | 77 | | −106 | |
| 202 | (50 Poly(2,3DMB-1), 506681 / 50 Oronite, 532680-1 | .0781 | | | | | | | | | |
| 203 | (50 Polypentene, 485501-10 / 50 Poly(2,3DMB-1), 506681 | .0815 | | | 5.45 | 44.78 | 37 | 41 | | −88 | |
| 204 | (30 TTPD, 506636-2 / 50 Polyvis, 506679-1 | .0816 | .041 | .043 | 4.27 | 28.20 | 46 | 30 | | −57 | −40 |
| 205 | (10 TTPD, 506636-2 / 90 Polyvis, 506622-10 | | .0408 | .045 | 4.62 | 37.27 | 4 | 0 | | −88 | |
| 206 | (90 Hyd. P-terphen, 506660 / 10 Polyvis, 506679-10 | .0886 | 0.458 | .048 | 4.93 | 51.99 | −75 | 0 | | −78 | |
| 207 | (30 TTPD, 506583 / 70 Polyvis, 506563 | .0824 | | | 5.71 | 90.28 | −198 | 0 | | −66 | −5 |
| 208 | (50 TTPD, 506636-2 / 50 Polyvis, 506563 | .0843 | .040 | .041 | 4.29 | 27.59 | 54 | 41 | | −89 | |
| 209 | (70 TTPD, 506622-10 / 30 Polyvis, 506679-10 | .0844 | | | 4.38 | 28.18 | 58 | | | −95 | |
| 210 | (10 Hyd. O-terphen, 506679-10 / 90 Polyvis, 506679-10 | .0819 | | | 4.15 | 23.80 | 77 | | | −105 | |
| 211 | (30 Hyd. O-terphen, 532506 / 70 PIB, 506649-10 | .0886 | | | 4.16 | 27.60 | 39 | | | −85 | |
| 212 | (30 Hyd. O-terphen, 506679-10 / 70 PIB, 532506 | .0824 | | | 3.85 | 23.13 | 51 | 34 | | −66 | |
| 213 | (50 PIB, 532538-10 / 50 Hyd. O-terphen, 506679-10 | .0885 | .0504 | .049 | 3.55 | 19.91 | 54 | 38 | 1,460 31,500 | −89 | |
| | (50 PIB, 532538-10 | | .0530 | | | | | | | | |
| 214 | (50 PIB, 532538-10 / 50 Hyd. O-terphen, 532616 | .0849 | .0530 | | 4.06 | 29.10 | 8 | | | −79 | |
| 215 | (33 PAMVCH, 506566 / 33 Polyoctene, 506623-1 / 33 Polyvis, 506566 | | .039 | .039 | 3.96 | 21.84 | 79 | 74 | KV₀ 1,026 KV₋₂₀ 4,062 KV₋₄₀ 24,617 | −95 | |
| 216 | (33 PIB, 532570-10 / 33 Polyvis, 532610 / 33 PAMVCH, 506566 | | .0464 | .051 | 3.96 | 22.33 | 74 | 66 | 1,460 5,310 32,250 | −95 | |
| 217 | (33 PAMVCH, 506566 / 33 PIB, 532570-10 / 33 Polyvis, 532610 | .0868 | | | | | | | | | |
| 218 | (25 PIB, 532570-10 / 25 Polyvis, 532610 | .0871 | | | | | | | | | |

See footnote at end of table.

TABLE V—Continued

| | Fluid | 4-ball | Proto-type | Rounds, average | Rounds, 500,000 p.s.i. | $KV_{210}$ | $KV_{100}$ | VTF VI | ASTM VI | Brookfield 0° F. | Brookfield -20° F. | Mol. wt. | $T_g$, °C. | Density | Pour point, °F |
|---|---|---|---|---|---|---|---|---|---|---|---|---|---|---|---|
| 219 | 50 PAMVCH, 506566 / 45 PIB, 532570-10 / 5 Polyvis, 532610 | .0893 | | | | | | | | | | | | | |
| 220 | 25 PAMVCH, 506566 / 70 PIB, 532570-10 / 5 Polyvis, 532610 | .0884 | | | | | | | | | | | | | |
| 221 | 85 PAMVCH, 506566 / 5 PIB, 532570-10 / 10 Polyvis, 532610 | .0885 | | | | | | | | | | | | | |
| | 15 PMVCH, 506566 / 15 PIB, 532570-10 | .0431 | | | | | | | | | | | | | |
| 222 | 70 Polyvis, 532610 / 15 PAMVCH, 506566 | .0871 | | | | | | | | | | | | | |
| 223 | 33 PIB, 532570-10 / 33 Indopol, 506626-1 | | | | | | | | | | | | | | |
| | Additives: | | | | | | | | | | | | | | |
| 224 | ½% ethyl 702 | .0859 | (⁴) | | | | | | | | | | | | |
| 225 | 2% acryloid 983 (disper.) | .0846 | (⁴) | | | | | | | | | | | | |
| 226 | 1% TCP (EP) | .0848 | (⁴) | | | | | | | | | | | | |
| 227 | ½% NaSul BSN (R+C) | .0847 | (⁴) | | | | | | | | | | | | |
| 228 | All above four | .0842 | (⁴) | | | | | | | | | | | | |
| 229 | ½% LZ 1360 (EP) | .0852 | (⁴) | | | | | | | | | | | | |
| 230 | ½% ultraphos (EP) | .0857 | (⁴) | | | | | | | | | | | | |
| 231 | 4.7% LZ 284 (GM pkg.) | .0854 | (⁴) | | | | | | | | | | | | |
| 232 | 6.75% K286 (new Ford pkg.) | .0860 | (⁷) | | | | | | | | | | | | |
| 233 | 5.0% LZ 280 (old Ford pkg.) | .0851 | (⁷) | | | | | | | | | | | | |
| 234 | 2% LZ 895 (disper.) | .0856 | (⁴) | | | | | | | | | | | | |
| 235 | Trac pkg. | .0849 | (⁴) | | | | | | | | | | | | |
| 236 | 10% Cyclohexanol | .0826 | (Control .0857) | .0464 | .045 | 4.49 | 37.37 | −15 | 0 | | | | −68 | | −5 |
| 237 | PAMVCH plus 1% Valeric Acid | .0882 | .0594 | .0332 | .040 | | | | | | | | | | |
| 238 | New 98 golden plus Pkg. | | | .0298 | .038 | | | | | | | 266 | | | −20 |
| 239 | PAMVCH plus 2.7% acryloid W-1600 (VI) | .0856 | .058 | .0436 | .047 | 6.49 | 53.18 | 70 | 78 | 46,250 | | | | | |
| 240 | PAMVCH plus 5% Acryloid W-1600 (VI) | | | .0464 | .049 | 9.30 | 80.9 | 93 | 99 | | | | | | |
| 241 | Control | .0908 | .0480 | | | 6.79 | 55.38 | 72 | 80 | | | | | | |
| 242 | 50 PAMVCH plus .7% acryloid / 50 PIB, W-1600 (VI) / 50 PAMVCH plus .4% acryloid / 50 PIB, W-1600 VI | | | .0464 / .0472 | .049 / .048 | 9.09 | 67.1 | 112 | 122 | | | | | | −35 |
| 243 | Control / PAMVCH plus trac pkg | | .0615 / .0620 | | | | | | | | | | | | |
| 244 | Control / 50 PAMVCH plus trac pkg / 50 Polyvis | .0850 | .0515 | | | 4.72 | 33.42 | 47 | 40 | 6,310 | 45,250 | | | | |
| 245 | Control / 60 PAMVCH plus trac pkg / 40 Oronite | | .0515 / .0545 | | | | | | | | | | | | |
| 246 | Control / 75 PAMVCH plus trac pkg / 25 Cronite | | .0560 | | | | | | | | | | | | |
| 247 | Control / 60 PAMVCH plus trac pkg / 40 Oronite | .0877 | .0570 / .0580 | | | 5.15 | 41.34 | 32 | 31 | 11,656, $KV_0$ | | | | | |

¹ 1,910 cp. at −40° F. ² 71,200 at −40. ³ 51,500 at −40. ⁴ 8,800 at −40. ⁵ Control .0848. ⁶ Control .0858. ⁷ Control .0857.

NOTES:
Pkg. Y = 12% DuPont PAM, ½% DuPont Ortholeum 304, 1% Stauffer TCP (EP).
Trac Pkg. = ½% Ethyl 702 (antioxid.), ½% Stauffer TCP (EP), ½% NaSul BSN (R+C), 2% LZ 895 (dispersant).

The invention claimed is:

1. A hydrocarbon base stock, useful as a lubricant having a kinematic viscosity at 210° F. in the range of 1.5–200.0 c.s. and comprising a blend of (i) at least one part by weight of a synthetic oil containing at least 95% of $C_{13}$–$C_{40}$ naphthene and (ii) from 0.1–20 parts by weight, based on said naphthene of at least one member from at least one of the following groups (a), (b) and (c):
   (a) a synthetic liquid $C_3$–$C_8$ olefin homopolymer, copolymer, or terpolymer;
   (b) a member from group (a) above which is at least partially hydrogenated; and,
   (c) a severely hydrorefined naphthenic mineral oil lube or paraffinic mineral oil lube containing less than 1% of gel aromatic hydrocarbons,
and wherein said base stock containing said blend has a coefficient of traction, measured at 600 ft./min., 200° F., 400,000 p.s.i., at least as high as that of ASTM Oil No. 3.

2. A hydrocarbon base stock according to Claim 1 and wherein said $C_{13}$–$C_{40}$ naphthene has a glass transition temperature in the range of −90 to −30° C. and contains, as a structural nucleus, a cyclohexyl hydrindan, di(cyclohexyl) alkane, spirodecane, spiropentane, perhydrofluorene, perhydrobiphenyl, perhydroterphenyl, Decalin, norbornane, perhydroindacene, perhydrohomotetraphthene, perhydroacenaphthene, perhydrophenanthrene, perhydrocrysene, perhydroindane-1-spirocyclohexane, perhydrocarylophyllene, pinane, camphane, perhydrophenylnaphthalene or perhydropyrene.

3. In a power transmission system comprising a traction drive transmission and a lubricant therefor, the improvement wherein said lubricant contains the hydrocarbon base stock according to Claim 1.

4. The transmission system of Claim 3 wherein said lubricant contains the hydrocarbon base stock of Claim 2.

5. In a method for improving the coefficient of traction between relatively rotatable members in torque transmitting relationship, the improvement which comprises introducing to the tractive surfaces of said members a lubricant containing the base stock of Claim 1.

6. A method of Claim 5 wherein the lubricant contains the base stock of Claim 2.

7. A lubricant composition containing from 95–50% of the base stock of Claim 1.

8. The hydrocarbon base stock of Claim 1 wherein said blend contains said naphthene and at least one member from said group (a) or (b).

9. The hydrocarbon base stock of Claim 2 wherein said blend contains said naphthene and at least one member from said group (a) or (b).

10. Process for increasing the traction coefficient of a hydrorefined petroleum mineral oil or liquid polyolefin oil or hydrogenated liquid polyolefin oil lubricant composition having a kinematic viscosity in the range of 1.5–200 cs. at 210° F., said process comprising incorporating in said composition an amount of a synthetic oil containing at least 95% of a $C_{13}$–$C_{40}$ naphthene, said amount being sufficient to increase the traction coefficient by at least 10% as measured at 600 ft./min., 200° F. and 400,000 p.s.i.

11. The process of Claim 11 wherein said oil contains at least 50 weight percent of naphthenes containing as a mutual structural nucleus one member selected from a cyclohexyl hydrindan, di(cyclohexyl) alkane, spirodecane, spiropentane, perhydrofluorene, perhydrobiphenyl, perhydroterphenyl, Decalin, norbornane, perhydroindacene, perhydrohomotetraphthene, perhydroacenaphthene, perhydrophenanthrene, perhydrocrysene, perhydroindane - 1- spirocyclohexane, perhydrocarylophyllene, pinane, camphane, perhydrophenylnaphthalene or perhydropyrene.

12. Process of Claim 12 wherein said lubricant has an ASTM VI of at least 40.

References Cited

UNITED STATES PATENTS

| | | | |
|---|---|---|---|
| 3,493,505 | 2/1970 | Ries et al. | 252—73 |
| 3,450,636 | 6/1969 | Rausch | 252—75 |
| 3,394,603 | 7/1968 | Rounds | 74—200 |
| 3,440,894 | 10/1966 | Hamman et al. | 74—200 |
| 3,608,385 | 9/1971 | Duling et al. | 252—73 |
| 3,597,358 | 8/1971 | Duling et al | 252—73 |
| 3,595,796 | 8/1971 | Duling et al. | 252—73 |

FOREIGN PATENTS

| | | | |
|---|---|---|---|
| 1,806,401 | 6/1969 | West Germany | 0—102 |

OTHER REFERENCES

Rounds, "Journal of Chemical & Engineering Data," Vol. 5, No. 4, October 1960, pp. 499–507.

HERBERT LEVINE, Primary Examiner

U.S. Cl. X.R.

208—19; 252—73